United States Patent
Wang et al.

(10) Patent No.: US 11,727,892 B1
(45) Date of Patent: Aug. 15, 2023

(54) EYE-TRACKING BASED FOVEATION CONTROL OF DISPLAYS

(71) Applicant: Meta Platforms Technologies, LLC, Menlo Park, CA (US)

(72) Inventors: Qianqian Wang, Santa Clara, CA (US); Gang Chen, San Jose, CA (US); Min Hyuk Choi, San Jose, CA (US); Zhiming Zhuang, Sammamish, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/054,016

(22) Filed: Nov. 9, 2022

(51) Int. Cl.
| | |
|---|---|
| G09G 3/36 | (2006.01) |
| G06T 3/40 | (2006.01) |
| G06F 3/01 | (2006.01) |
| G06V 10/25 | (2022.01) |
| G06T 7/13 | (2017.01) |

(52) U.S. Cl.
CPC ........... G09G 3/3611 (2013.01); G06F 3/013 (2013.01); G06T 3/4053 (2013.01); G06T 7/13 (2017.01); G06V 10/25 (2022.01)

(58) Field of Classification Search
CPC ..... G09G 3/3611; G06F 3/013; G06T 3/4053; G06T 7/13; G06V 10/25
See application file for complete search history.

(56) References Cited

U.S. PATENT DOCUMENTS

| | | | |
|---|---|---|---|
| 5,526,072 | A | 6/1996 | El Hage |
| 9,299,320 | B1 | 3/2016 | Gupta |
| 10,176,639 | B2 | 1/2019 | Schowengerdt et al. |
| 11,112,791 | B2 | 9/2021 | Bhanushali et al. |
| 11,209,656 | B1* | 12/2021 | Choi .................. G02B 27/0101 |
| 2008/0252591 | A1 | 10/2008 | Peeters et al. |

(Continued)

FOREIGN PATENT DOCUMENTS

WO    WO-2018168781 A1    9/2018

OTHER PUBLICATIONS

International Search Report and Written Opinion for International Application No. PCT/US2021/052838, dated Jan. 5, 2022, 12 pages.

(Continued)

*Primary Examiner* — Abhishek Sarma
(74) *Attorney, Agent, or Firm* — Weaver Austin Villeneuve & Sampson LLP

(57) ABSTRACT

Described is a system including a display, a display controller, and control logic communicatively coupled to the display. The display controller determines, based on coordinates of a focus point on the display, boundaries of a first image region and a second image region in an output image to be rendered. The focus point is determined through tracking an eye movement of a user viewing the display. The first image region has a higher resolution than the second image region. The display controller is configured to send image data together with control signals to the control logic. The control signals cause the control logic to render the output image on the display using the image data. As part of rendering the second image region, the control logic outputs a shared signal onto signal lines that are coupled to light sources in a group of adjacent rows or columns.

20 Claims, 12 Drawing Sheets

(56) References Cited

U.S. PATENT DOCUMENTS

| | | |
|---|---|---|
| 2012/0249797 A1 | 10/2012 | Haddick et al. |
| 2013/0088413 A1 | 4/2013 | Raffle et al. |
| 2013/0114043 A1 | 5/2013 | Balan et al. |
| 2014/0071296 A1 | 3/2014 | Nagai |
| 2014/0253605 A1 | 9/2014 | Border et al. |
| 2014/0313760 A1 | 10/2014 | Yagi |
| 2016/0034032 A1 | 2/2016 | Jeong |
| 2017/0169749 A1 | 6/2017 | Masuda |
| 2017/0337857 A1 | 11/2017 | Tiberi et al. |
| 2018/0188803 A1 | 7/2018 | Sharma et al. |
| 2018/0308266 A1 | 10/2018 | Surti et al. |
| 2020/0074941 A1 | 3/2020 | Takahashi |
| 2020/0348665 A1 | 11/2020 | Bhanushali et al. |
| 2021/0165213 A1* | 6/2021 | Balachandreswaran ............... G02B 27/0172 |

OTHER PUBLICATIONS

Notice of Allowance dated Aug. 18, 2021 for U.S. Appl. No. 17/063,026, filed Oct. 5, 2020, 9 pages.

* cited by examiner

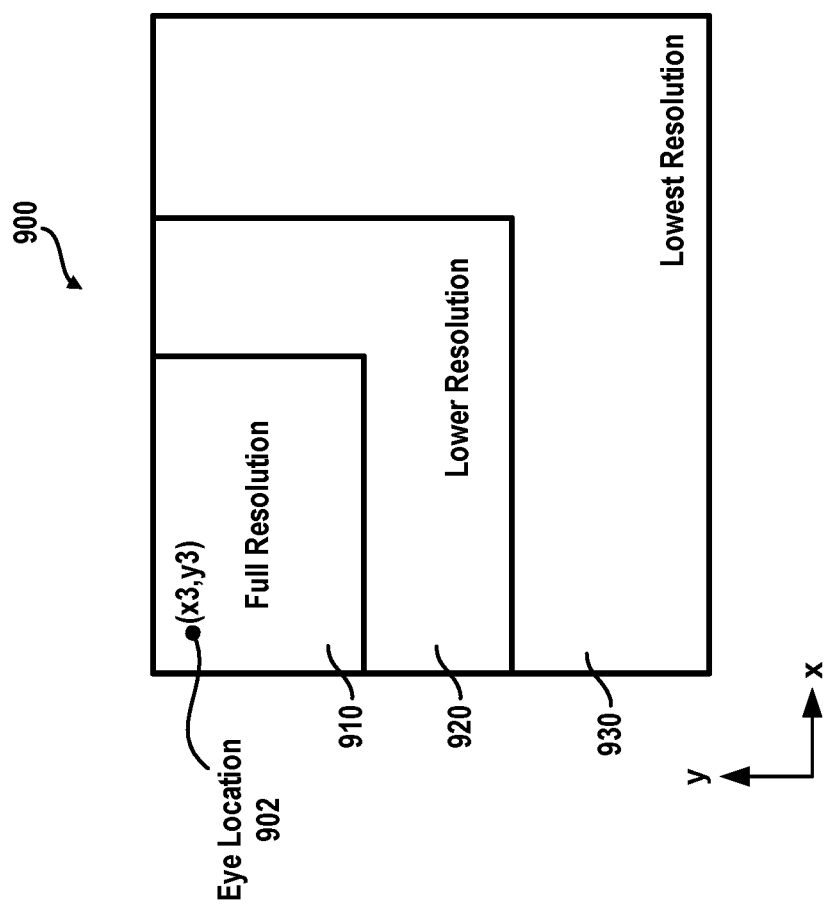

EYE-TRACKING BASED FOVEATION CONTROL OF DISPLAYS

TECHNICAL FIELD

The present disclosure generally relates to foveation control of displays. In particular, aspects of the disclosure are directed to varying the resolution of different areas of an image presented on a display, based on tracking eye movement of a user viewing the display. Aspects of the present disclosure also relate to displays in artificial reality systems.

BACKGROUND

Artificial reality systems are becoming increasingly ubiquitous, with applications in many fields. In general, artificial reality is a form of reality that has been adjusted in some manner before presentation to a user. Artificial reality may include, for example, virtual reality (VR), augmented reality (AR), mixed reality (MR), hybrid reality, or some combination and/or derivatives thereof. Typical artificial reality systems include one or more devices for rendering and displaying content to users. As one example, an artificial reality system may incorporate a head-mounted display (HMD) that is worn by a user and configured to output artificial reality content to the user. During operation, the user typically interacts with the artificial reality system to select content, launch software applications, configure the system and, in general, experience artificial reality environments.

Modern display devices are often based on light emitting diode (LED) technology. Display devices in artificial reality systems tend to be smaller compared to electronic displays in other applications, such as television sets or desktop monitors. Despite being smaller, display devices in artificial reality systems are usually high-resolution, with large pixel counts and high pixel density because such displays are typically viewed up close. To meet performance requirements in a small and/or portable form factor, HMDs and other display devices used in an artificial reality environment are sometimes built from micro-LEDs, which can have a linear dimension (e.g., diameter) of less than 200 microns.

High resolution displays tend to consume more power and demand more resources, including heavier signal processing workload and higher bandwidth requirements due to the increase in the amount of image data and control signals used to drive the display. For example, a large pixel count combined with a relatively high refresh rate may exceed the signal transmission capabilities and processing speed of some display systems. Further, the power consumption of the display itself (e.g., an LED panel) and the power consumption of the display driver are both expected to increase in correspondence with display resolution. The amount of heat generated also increases along with power consumption. Prolonged operation at high temperatures can contribute to pixel degradation and lead to burn-in or reduced brightness over time. Therefore, display longevity remains a concern even if resource requirements are otherwise met.

SUMMARY

Aspects of the disclosure are directed to techniques for implementing foveated imaging through dynamically controlling the resolution of different areas of an output image based on eye-tracking. Although a display screen has a native resolution determined by the pixel count of the display (sometimes referred to as hardware resolution), the output image rendered on the display can be manipulated, e.g., through digital image processing, to set the effective resolution to be different than the native resolution. For example, the operating system software of a personal computer typically permits a user to change the resolution of the display as a whole. Foveated imaging is a technique of varying the resolution at different locations in an image presented on a display screen so that some areas have higher resolution than other areas.

Conventional foveated imaging renders the display image with the highest resolution at the center of the display screen, under the assumption that the user's gaze is focused on the middle of the screen. However, users typically move their eyes to focus on different parts of a screen over the course of one or more images being presented. With conventional foveated imaging, there is a high likelihood that the user will at some point change focus to a low resolution area of the image. This results in a poor viewing experience since the image quality at the low resolution area is worse compared to the quality at the middle. In particular, the low resolution area has significantly less detail and may be noticeably blurrier.

To improve on conventional foveated imaging while addressing the issues described above with respect to high resolution displays, aspects of the present disclosure involve using eye-tracking to vary the image resolution such that the highest resolution area of the image follows the focus position of the user's eye. The foveation techniques described herein can also reduce power consumption of the display control components (e.g., a display driver and associated control logic) and signal bandwidth since the control components may not need to process as much image data and/or transmit as much processed image data compared to when the entire display is driven at full resolution.

Additionally, aspects of the disclosure relate to implementing foveated imaging using control logic that generates signals for driving the pixels in a display in cooperation with a display driver. The control logic can offload some of the imaging processing that would otherwise be performed by the display driver or other display controller. In particular, the control logic can be configured to perform foveation operations more efficiently and with less power consumption. In some embodiments, the control logic includes hardware (e.g., digital circuitry) that is integrated into a display panel and configured to lower the resolution for a portion of an image by selectively combining image data and corresponding scan signals for a group of rows or columns, under the direction of the display driver. In this manner, the number of signals used to drive the display can be reduced. By contrast, conventional foveation typically involves image processing to place the image data into a foveated format before the image data is sent to the display driver. Although the image data is foveated, the input to the display is still formatted as a full resolution image so that the image data is supplied for each pixel individually, which can lead to high power consumption. For example, under a traditional approach, the display driver may send separate image data for each row or column of the display, through signal lines coupled to the display pixels. Further, the display driver may also generate a separate scan signal for each row or column. Consequently, the number of signals input to the display could be the same as when the display is driven at full or native resolution.

In some embodiments, a system includes a display, a display controller, and control logic communicatively coupled to the display. The display includes a plurality of light sources arranged in rows and columns. The display controller is configured to obtain coordinates of a focus point on the display. The focus point is determined through tracking an eye movement of a user viewing the display. The display controller is further configured to determine, based on the coordinates of the focus point, boundaries of a first image region and a second image region in an output image to be rendered on the display. The first image region has a higher resolution than the second image region. The display controller is further configured to send image data together with control signals to the control logic. The control signals cause the control logic to render the output image on the display using the image data. The control logic is configured to, as part of rendering the second image region, output a shared signal onto signal lines that are coupled to light sources in a group of adjacent rows or columns.

In some embodiments, the above-described system further includes an eye-tracking unit communicatively coupled to the display controller. The eye-tracking unit is configured to capture at least one image of the user's eye. The eye-tracking unit or the display controller is configured to determine the focus point using the at least one image.

In some embodiments, the display controller is configured to vary a size, a location, or both a size and a location, of at least the first image region in response to a change in the focus point. In some embodiments, second image region at least partially surrounds the first image region. In some embodiments, the display controller is configured to set a size of the first image region according to a first viewing angle and a size of the second image region according to a second viewing angle, where the first viewing angle and the second viewing angle are programmable according to input from the user.

In some embodiments, the shared signal output by the control logic is a scan signal. Alternatively, the shared signal can be a signal carrying foveated image data. In some embodiments, both shared scan signals and shared data signals are output through control logic to drive the display.

In some embodiments, the control signals sent by the display controller indicate the boundaries of the first image region and the second image region. In some embodiments, the output image includes at least one additional image region having a resolution lower than the resolution of the first image region but higher than the resolution of the second image region.

In some embodiments, a method of rendering an output image on a display having light sources arranged in rows and columns involves obtaining, by a display controller, coordinates of a focus point on the display. The focus point is determined through tracking an eye movement of a user viewing the display. The method further involves determining, by the display controller and based on the coordinates of the focus point, boundaries of a first image region and a second image region in the output image to be rendered. The first image region has a higher resolution than the second image region. The method further involves sending, by the display controller, image data together with control signals to control logic communicatively coupled to the display. The control signals cause the control logic to render the output image on the display using the image data. The control logic is configured to, as part of rendering the second image region, output a shared signal onto signal lines that are coupled to light sources in a group of adjacent rows or columns.

In some embodiments, the above-described method or other method disclosed herein is implemented through instructions stored on a non-transitory computer-readable medium. The instructions are executable by one or more processors, e.g., a processor of a display controller, to cause the method to be performed.

BRIEF DESCRIPTION OF THE DRAWINGS

Illustrative embodiments are described in detail below with reference to the following figures.

FIG. 9 shows an example of a foveated image rendered at a time when a user's eye is focused near an edge of a display, according to certain embodiments.

Figure 1:
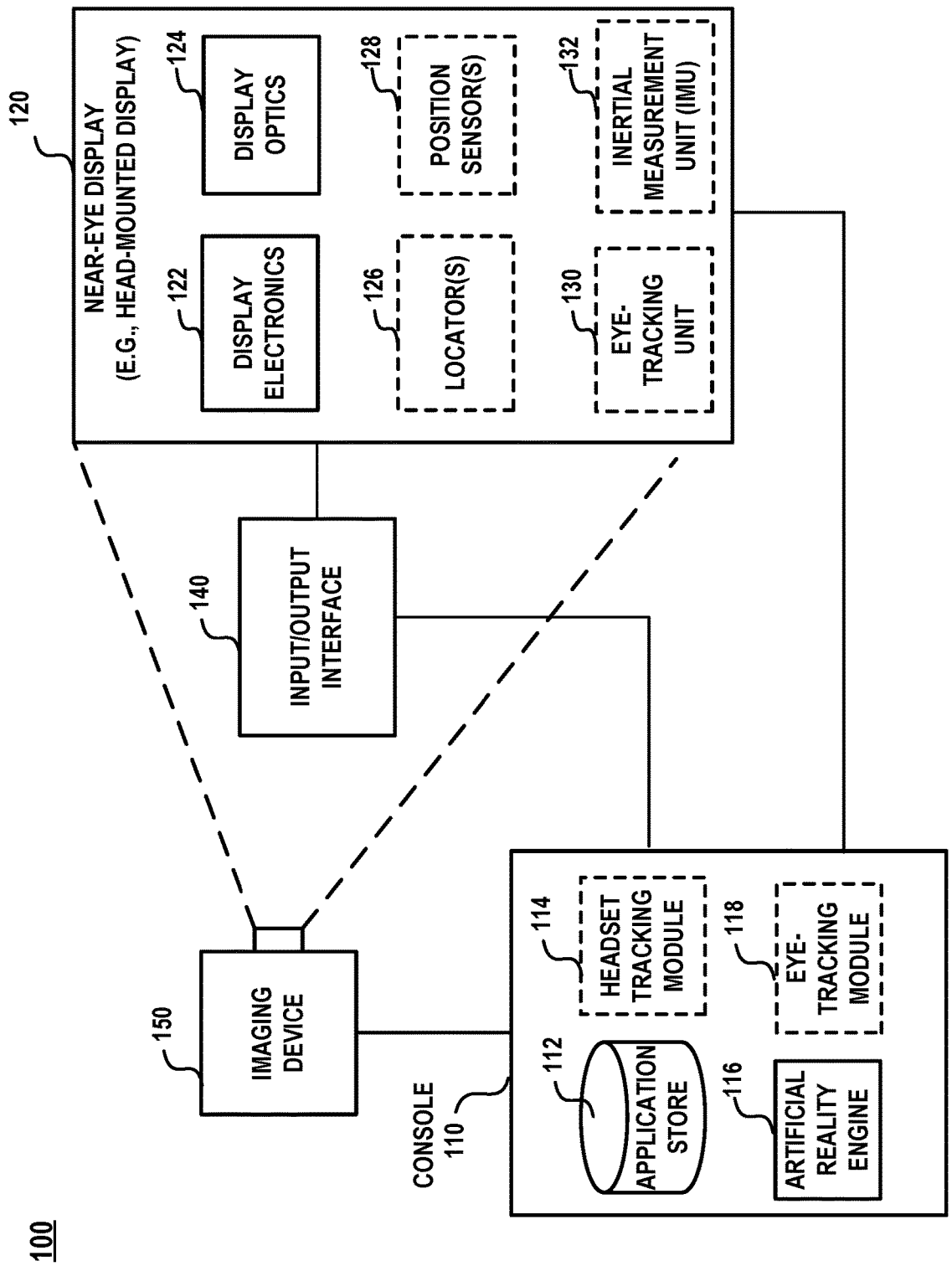
FIG. 1 is a block diagram of an example artificial reality system environment in which one or more embodiments can be implemented.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Disclosed herein are techniques for implementing foveated imaging. More specifically, and without limitation, disclosed herein are methods and corresponding systems and apparatus for dynamically controlling the resolution of different areas in a display image based on eye-tracking.

Foveated imaging is a method of varying the resolution at different locations in an image presented on a display so that some areas have higher resolution than other areas. According to certain embodiments, an output image rendered on a display includes at least two image regions that differ in resolution. For example, a first image region may correspond to a higher resolution (e.g., native or full resolution) area of the output image and a second image region may correspond to a lower resolution area.

In some embodiments, a display system includes a display controller (e.g., a driver circuit plus a separate image processor, or a standalone display driver) and control logic communicatively coupled between the display controller and the display. The display can be an LED-based display in which an individual pixel is formed by one or more LEDs, e.g., at least one red LED, at least one green LED, and at least one blue LED. More specifically, certain embodiments may feature a display formed using micro-LEDs. However, the techniques described herein are applicable to any pixelated display. Accordingly, other light sources besides LEDs may be used.

The display controller can be integrated into the display. For example, the display controller may be an integrated circuit chip residing on the same circuit board or substrate as the light sources of the display. In some embodiments, the display controller may be implemented as one or more chips connected to the display, e.g., via a flexible ribbon cable, chip-to-chip interconnects, or some other wired interface.

As used herein, the term "micro-LED" refers to an LED having a linear dimension less than about 200 microns or micrometers (μm). For example, a micro-LED may have a diameter of less than 200 μm, less than 100 μm, less than 10 μm, or even smaller in some instances.

As used herein, the term "image resolution" refers to the resolution of an output image rendered on a display. Image resolution is not necessarily the same as native resolution. Native resolution is a physical property determined by the number of pixels in the display, e.g., a vertical pixel count and a horizontal pixel count. In contrast, image resolution can be set by rendering the output image such that the effective number of pixels differs from that of the physical number of pixels.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a block diagram of an example artificial reality system environment 100 in which one or more embodiments can be implemented. Artificial reality system environment 100 includes a near-eye display 120, an imaging device 150, and an input/output interface 140, each of which may be coupled to a console 110. While FIG. 1 shows an example of artificial reality system environment 100 including one near-eye display 120, one imaging device 150, and one input/output interface 140, any number of these components may be included in artificial reality system environment 100, or any of the components may be omitted. For example, there may be multiple near-eye displays 120 monitored by one or more imaging devices 150 in communication with console 110. In some implementations, artificial reality system environment 100 may not include imaging device 150, input/output interface 140, and/or console 110. In other implementations, components not depicted (e.g., different and/or additional components) may be included in artificial reality system environment 100.

Near-eye display 120 may be a head-mounted display (HMD) that presents content to a user. Examples of content that can be presented by near-eye display 120 include images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may be implemented in any form factor suitable for a particular application, including as a pair of glasses. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to the user.

In various embodiments, near-eye display 120 may include display electronics 122, display optics 124, and/or an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, various elements shown in FIG. 1 may be combined into a single element in some embodiments.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro-LED display, an active-matrix OLED display (AMOLED), a transparent OLED display (TOLED), or some other display type. In one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels that emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

Display optics 124 may direct image light received from the display electronics 122 (e.g., using optical waveguides and couplers), magnify the image light, correct optical errors associated with the image light, and present the corrected image light to a user of near-eye display 120. In various embodiments, display optics 124 may include one or more optical elements, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain a relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be farther from the user's eyes than the near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Examples of two-dimensional errors include barrel distortion, pincushion distortion, longitudinal chromatic aberration, and transverse chromatic aberration. Three-dimensional errors may include optical errors that occur in three dimensions. Examples of three-dimensional errors include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nanometers (nm) to 750 nm), in the infrared (IR) band (e.g., about 750 nm to 1 millimeter (mm)), in the ultraviolet band (e.g., about 10 nm to about 380 nm), in another portion of the electromagnetic spectrum, or in any combination of portions of the electromagnetic spectrum.

Imaging device 150 may include one or more cameras, one or more video cameras, any other device capable of capturing images including one or more of locators 126, or any combination thereof. Additionally, imaging device 150 may include one or more filters (e.g., to increase signal to noise ratio). Imaging device 150 may be configured to detect light emitted or reflected from locators 126 in a field of view of the imaging device 150. In embodiments where locators 126 include passive elements (e.g., retroreflectors), the imaging device 150 may include a light source that illuminates some or all of locators 126, which may retro-reflect the light to the light source in imaging device 150. The imaging device 150 may communicate slow calibration data to console 110, and the imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 include accelerometers, gyroscopes, magnetometers, other motion-detecting or error-correcting sensors, or any combination thereof. In some embodiments, position sensors 128 may include multiple accelerometers to measure translational motion (e.g., forward/back, up/down, or left/right) and multiple gyroscopes to measure rotational motion (e.g., pitch, yaw, or roll).

IMU 132 may be an electronic device that generates fast calibration data based on measurement signals received from one or more position sensors 128. Position sensors 128 may be located external to IMU 132, internal to IMU 132, or both externally and internally. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye-tracking may involve determining an eye's position, including orientation and location of the eye relative to near-eye display 120. An eye-tracking system may include an imaging system to image one or more eyes and may optionally include a light emitter, which may generate light that is directed to an eye such that light reflected by the eye is captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130).

Near-eye display 120 may use the orientation of the eye to, e.g., determine an inter-pupillary distance (IPD) of the user, determine gaze direction, introduce depth cues (e.g., blur an image outside of the user's main line of sight), collect information on user interactions (e.g., time spent on any particular subject, object, or frame as a function of exposed stimuli), and/or perform other operations based on the orientation of at least one of the user's eyes. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be configured to allow a user to send action requests to console 110. For example, an action request may be to start or to end a software application or to perform a particular action within the software application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received or when console 110 has performed a requested action. In some embodiments, an imaging device 150 may be used to track the input/output interface 140 and/or track the user's hand movement. For example, near-eye display 120 may include an imaging device 150 that tracks the location or position of a hand-held controller (e.g., using a light source on the controller) so that the user's hand movement can be inferred from changes in the location or position of the controller.

Console 110 may provide content to near-eye display 120 for presentation to the user in accordance with information received from imaging device 150, near-eye display 120, and/or input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functionality may also be distributed among components of console 110 in a different manner than is described here.

One or more components of the artificial reality system environment 100 (e.g., the console 110 and/or the display electronics 122) may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions that, when executed by one or more processors, cause the processor(s) to perform operations in accordance with the techniques described herein.

In general, any component in the artificial reality system environment 100 that processes data may include one or more processing units and/or one or more memory devices.

Besides the console 110, such components may include the near-eye display 120, the input/output interface 140, and/or the imaging device 150. Examples of processing units include a central processing unit (CPU), a graphics processing unit (GPU), a field programmable gate array (FPGA), and integrated circuits. In some embodiments, at least some processing units are implemented as a System on Chip (SoC). For example, console 110 and near-eye display 120 may each include one or more SoCs operating as co-application processors, sensor aggregators, display controllers, encryption/decryption engines, hand/eye/depth tracking and pose computation elements, video encoding and rendering engines, communication control components, and/or the like. In one example, near-eye display 120 may include a first SoC operating as a display controller for a left display, a second SoC operating as a display controller for a right display, and a third SoC operating as the eye-tracking unit 130.

Application store 112 may store one or more applications for execution by console 110. An application may include instructions that, when executed by a processor, generates content for presentation to the user. Content generated by an application may be in response to inputs received from the user via movement of the user's eyes or inputs received from the input/output interface 140. Examples of applications that may be in the application store 112 include gaming applications, conferencing applications, video playback applications, and/or other applications suitable for execution in an artificial reality environment.

Headset tracking module 114 may track movements of near-eye display 120 using slow calibration information from the imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future position of near-eye display 120. Headset tracking module 114 may provide the predicted position of the near-eye display 120 to the artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140 and provide feedback to the user indicating that the action has been performed. The feedback may be visual or audible feedback presented via near-eye display 120 or haptic feedback presented via input/output interface 140.

Eye-tracking module 118 may receive eye-tracking data from eye-tracking unit 130 and determine the position of the user's eye based on the eye tracking data. Eye position may include an eye's orientation, location, or both relative to near-eye display 120 or any element thereof. In addition or as an alternative to eye tracking and headset tracking, one or more components of the artificial reality system environment 100 may be configured to track other features of the user and/or aspects of the physical environment external to near-eye display 120.

In some embodiments, eye-tracking module 118 may store a mapping between images captured by eye-tracking unit 130 and eye positions to determine a reference eye position from an image captured by eye-tracking unit 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display 120. Example eye calibration parameters may include an estimated distance between a component of eye-tracking unit 130 and one or more parts of the eye, such as the eye's center, pupil, cornea boundary, or a point on the surface of the eye. Other example eye calibration parameters may be specific to a user and may include an estimated average eye radius, an average corneal radius, an average sclera radius, a map of features on the eye surface, and an estimated eye surface contour. In embodiments where light from the outside of near-eye display 120 may reach the eye (as in some augmented reality applications), the calibration parameters may include correction factors for intensity and color balance due to variations in light from the outside of near-eye display 120. Eye-tracking module 118 may use eye calibration parameters to determine whether the measurements captured by eye-tracking unit 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display system 120 experiencing greater than a threshold change in illumination due to external light. In some embodiments, at least some of the functions of eye-tracking module 118 may be performed by eye-tracking unit 130.

As discussed above, display electronics 122 may include one or more display panels. Display electronics 122 may further include one or more display controllers, e.g., a separate controller for each display panel or a shared controller for multiple display panels. A display panel can include one or more arrays of emitters arranged into rows and columns. For example, a display panel can include an array of red LEDs, an array of green LEDs, and an array of blue LEDs. The display controller(s) of the display electronics 122 may be configured to perform foveation operations in conjunction with functionality provided by control logic that can also be part of the display electronics 122, e.g., control logic integrated into or communicatively coupled to the display controller(s). As discussed below, such control logic may be responsible for combining various signals for input to a display panel, in order to generate a foveated image more efficiently.

Figure 2:
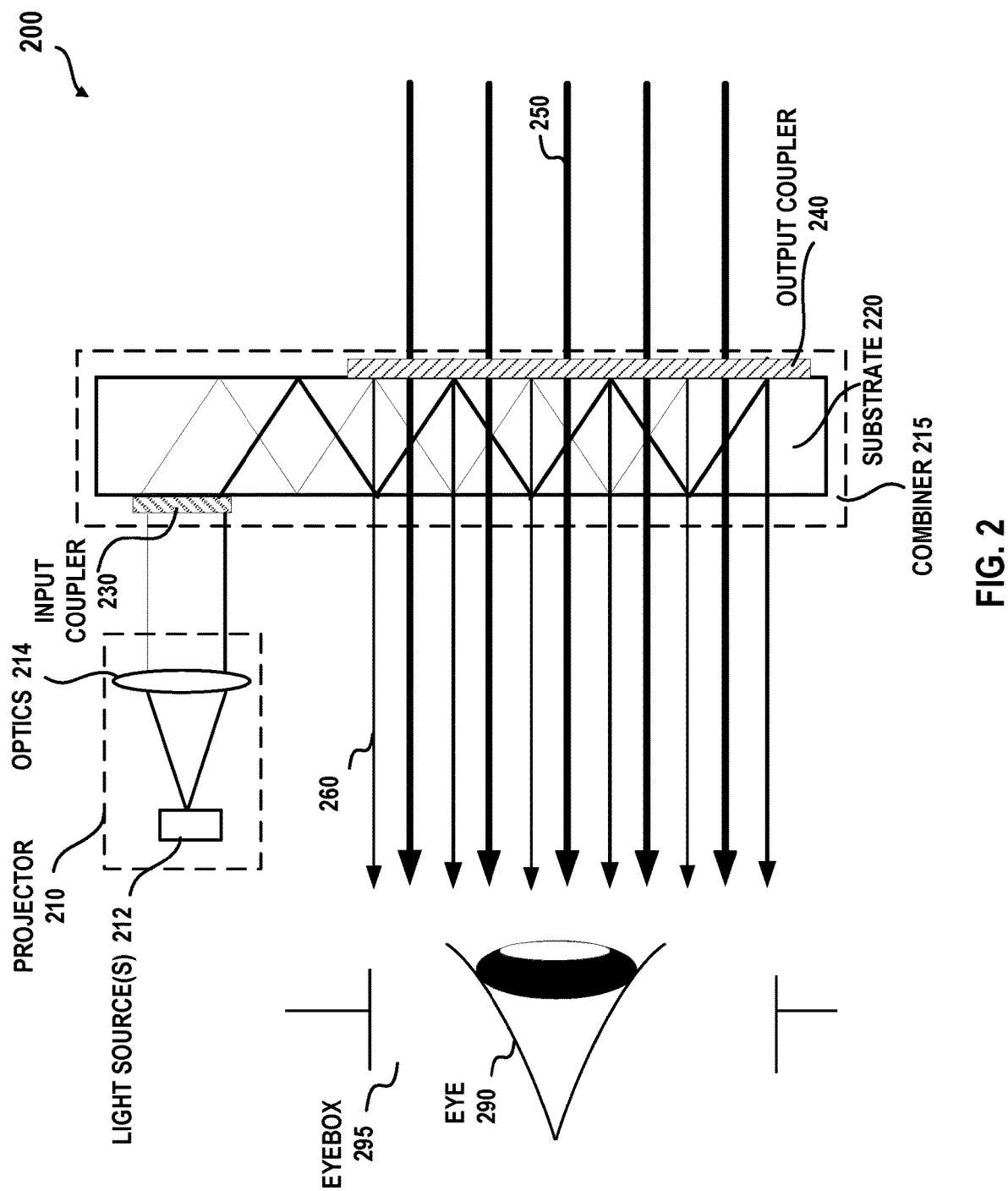
FIG. 2 shows an example of an augmented reality system usable for implementing one or more embodiments.

FIG. 2 shows an example of an augmented reality system 200 usable for implementing one or more embodiments. Augmented reality system 200 may include a projector 210 and a combiner 215. Projector 210 may include one or more light sources 212 and optics 214. In some embodiments, light sources 212 operate to emit light corresponding to an image for display. For example, light sources 212 may include a plurality of pixels that collectively form an LCD display panel or an LED display panel. In some embodiments, a light source 212 may generate coherent or partially coherent light. For example, a light source 212 may include a laser diode, a vertical cavity surface emitting laser, an LED, and/or a micro-LED. In some embodiments, light sources 212 are arranged into a one-dimensional or two-dimensional array, each light source emitting monochromatic image light corresponding to a primary color (e.g., red, green, or blue). In a more specific example, light sources 212 can include three two-dimensional arrays of micro-LEDs, where each two-dimensional array of micro-LEDs may include micro-LEDs configured to emit light of a primary color (e.g., red, green, or blue). In some embodiments, a light source 212 may include or be optically coupled to an optical pattern generator, such as a spatial light modulator.

Optics 214 may include one or more optical components that can condition the light emitted by the light sources 212, such as expanding, collimating, scanning, or projecting the emitted light into the combiner 215. Examples of such optical components include solid lenses, liquid lenses, mirrors, apertures, and/or gratings. For instance, in some embodiments, light sources 212 may include one or more micro-LED arrays (each array being one-dimensional or two-dimensional), and optics 214 may include a scanning apparatus (e.g., a rotating mirror or prism) configured to mechanically scan the micro-LED arrays along one or more dimensions to generate image frames.

Combiner 215 operates as a waveguide and may include an input coupler 230 for coupling light from projector 210 into a substrate 220 of the combiner 215. Combiner 215 may be light transparent (see-through) and may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 230 may include a volume holographic grating, a diffractive optical element (DOE) (e.g., a surface-relief grating), a slanted surface of substrate 220, or a refractive coupler (e.g., a wedge or a prism). For example, the input coupler 230 may include a reflective volume Bragg grating or a transmissive volume Bragg grating. Input coupler 230 may have a coupling efficiency of greater than 30%, 50%, 75%, 90%, or higher for visible light. Light coupled into substrate 220 may propagate within substrate 220 through, for example, total internal reflection (TIR).

Substrate 220 may have a flat or a curved surface, and may include one or more types of dielectric materials, such as glass, quartz, plastic, polymer, poly(methyl methacrylate) (PMMA), crystal, or ceramic. A thickness of the substrate 220 may range from, for example, less than about 1 mm to about 10 mm or more. In some embodiments, a separate projector 210 and corresponding combiner 215 is provided for each eye of the user. Substrate 220 may include or be optically coupled to one or more output couplers 240. Each output coupler 240 may be configured to extract at least a portion of the light guided by and propagating within substrate 220, and to direct extracted light 260 to an eyebox 295 where an eye 290 of the user of augmented reality system 200 is located. The output couplers 240 may replicate the exit pupil to increase the size of eyebox 295 such that the displayed image is visible in a larger area. As with the input coupler 230, an output coupler 240 may include a grating, a DOE, a prism, and/or the like. For example, output couplers 240 may include reflective volume Bragg gratings or transmissive volume Bragg gratings.

Substrate 220 and/or output couplers 240 may allow light 250 from the environment in front of combiner 215 to pass through with little or no loss. For example, in some implementations, output couplers 240 may have a very low diffraction efficiency such that light 250 may be refracted or otherwise pass through output couplers 240 with little loss and thus have a higher intensity than extracted light 260. Consequently, the user may be able to view combined images of the environment in front of combiner 215 and images of virtual objects projected by projector 210. Further, output couplers 240 may have different coupling (e.g., diffraction) efficiencies at different locations or directions (e.g., diffraction angles). In some implementations, at least a portion of the output couplers 240 may have a high diffraction efficiency for light 250.

Figure 3:
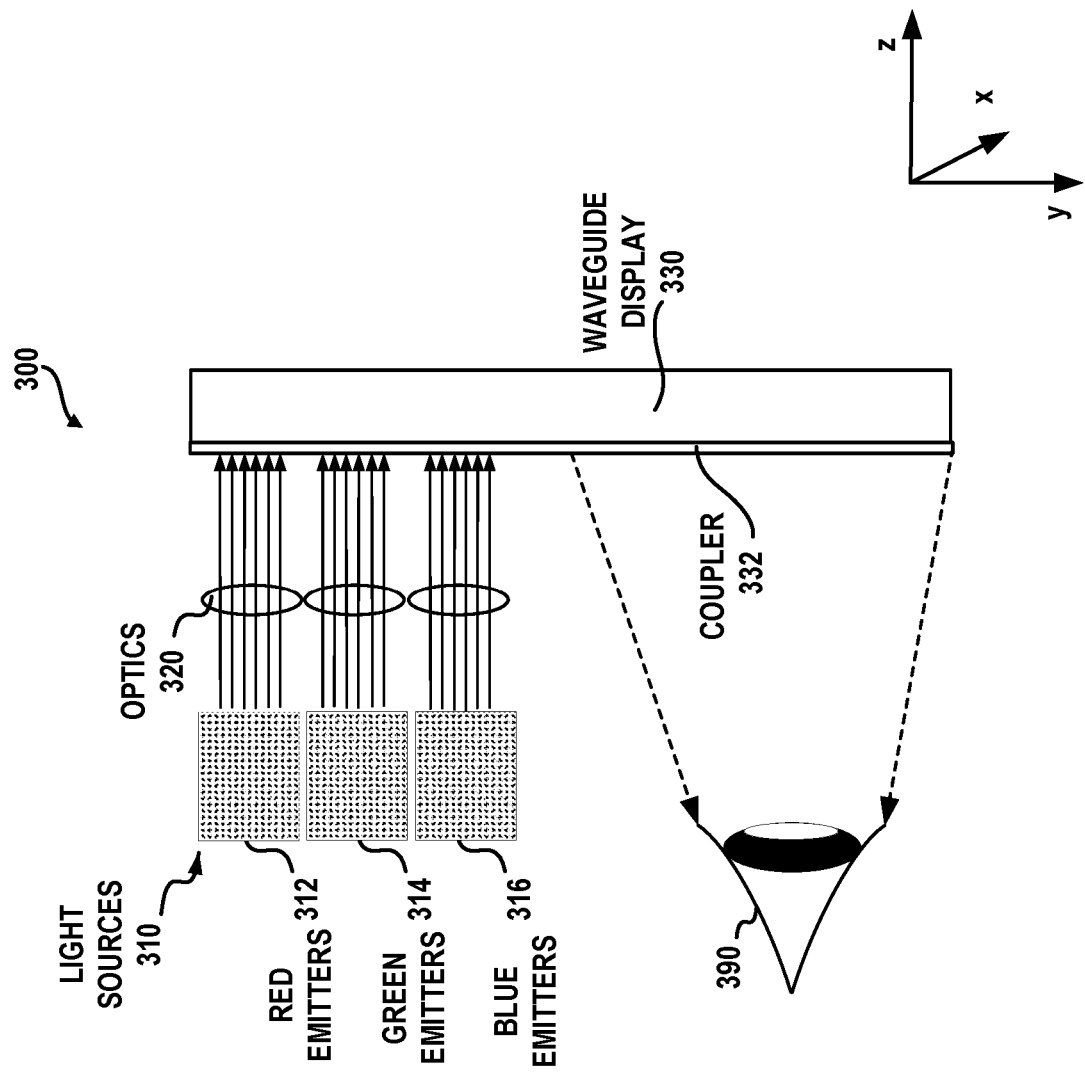
FIG. 3 shows an example of a near-eye display device usable for implementing one or more embodiments.

FIG. 3 shows an example of a near-eye display (NED) device 300 usable for implementing one or more embodiments. NED device 300 may be an example of near-eye display 120 in FIG. 1, augmented reality system 200 in FIG. 2, or another type of display device. NED device 300 may include light sources 310, optics 320, and a waveguide display 330. Light sources 310 can include multiple panels of light emitters for different colors, such as a panel of red light emitters 312, a panel of green light emitters 314, and a panel of blue light emitters 316. The red light emitters 312 are organized into an array; the green light emitters 314 are organized into an array; and the blue light emitters 316 are organized into an array. The dimensions and pitches of light emitters may be relatively small. For example, each light emitter in the light sources 310 may have a diameter less than 2 μm (e.g., about 1.2 μm) and the pitch may be less than 2 μm (e.g., about 1.5 μm). As such, the number of red light emitters 312, green light emitters 314, and blue light emitters 316 can be equal to or greater than the number of pixels in a display image, such as 960×720, 1280×720, 1440×1080, 1920×1080, 2160×1080, or 2560×1080 pixels. This permits a complete display image to be generated through simultaneous emission by the light sources 310.

Before reaching waveguide display 330, the light emitted by light sources 310 may be conditioned by the optics 320, which may include a lens array. The optics 320 may collimate or focus the light emitted by light sources 310 to waveguide display 330, which may include a coupler 332 for coupling the light emitted by light source 310 into waveguide display 330. The light coupled into waveguide display 330 may propagate within waveguide display 330 through, for example, total internal reflection as described above with respect to FIG. 2. Coupler 332 may also couple portions of the light propagating within waveguide display 330 out of waveguide display 330 and towards an eye 390 of a user. Accordingly, the coupler 332 may be configured to operate as both an input coupler and an output coupler.

Figure 4:
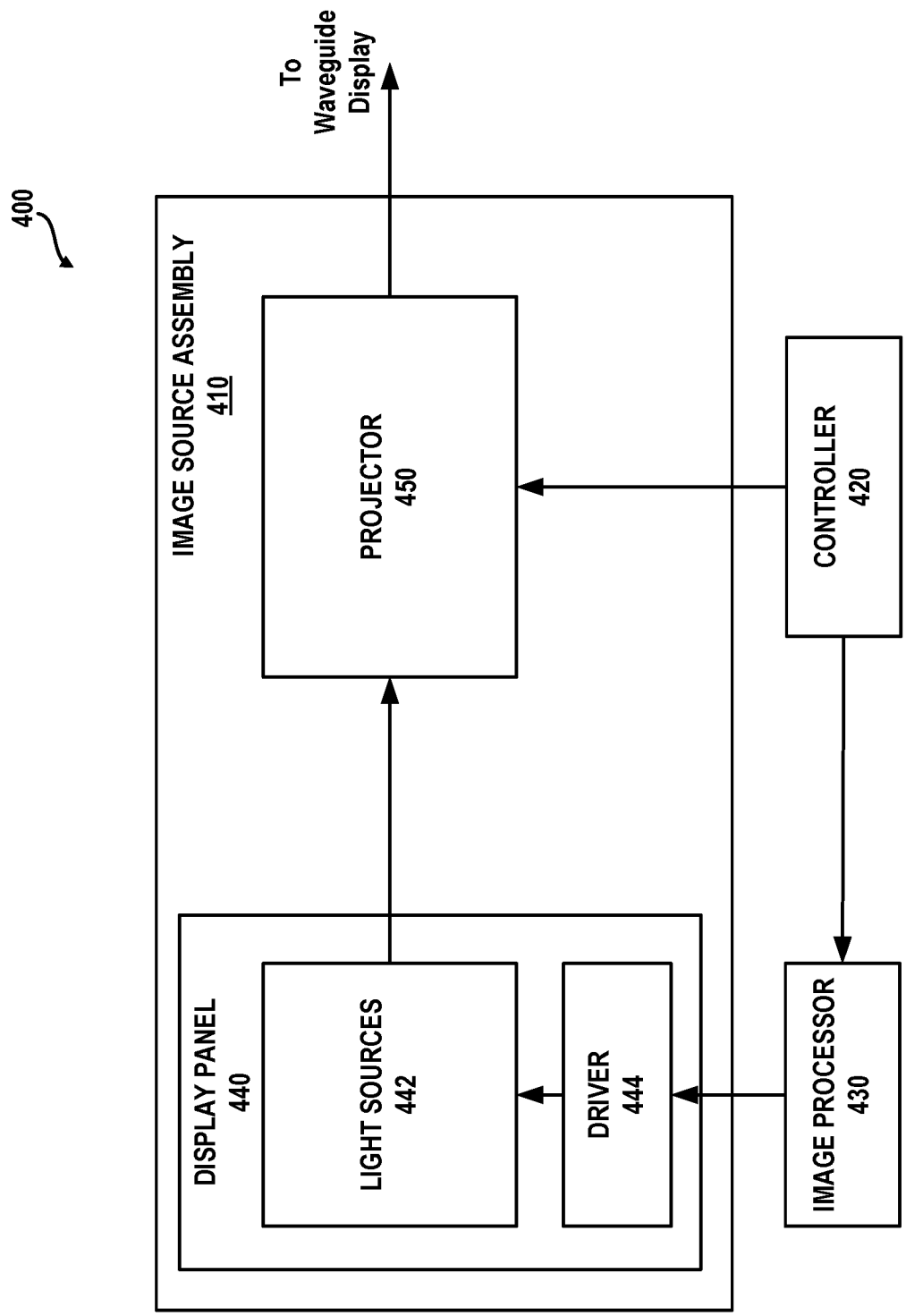
FIG. 4 is a block diagram of a near-eye display system according to certain embodiments.

FIG. 4 is a block diagram of an NED system 400 according to certain embodiments. The NED system 400 includes an image source assembly 410 with a display panel 440. The display panel 440 is configured to generate display images to be projected onto a user's eye by a projector 450. For example, the projector 450 may project a display image onto a waveguide display as described above with respect to FIGS. 2 and 3. NED system 400 is shown with a single display panel 440. However, in some embodiments, NED system 400 may include a separate display for both each eye (e.g., a left panel and a right panel). Additional instances of components described in connection with the display 440 may be provided for each display. Alternatively, one or more components of NED system 400 may be shared between displays. For example, NED system 400 may include a separate controller 420, image processor 430, and/or driver 444 for each display.

Display panel 440 includes light sources 442 and a driver circuit 444 for the light sources 442. The light sources 442 may include one or more arrays of emitters configured, for example, in the manner described above with respect to the light sources 310. As such, the projector 450 may include optics 320 and/or other optical components. Light sources 442 may include one or more arrays of light emitters, each array being one-dimensional or two-dimensional. Each light emitter may emit monochromatic light, such as red light, blue light, green light, infra-red light, and the like. While RGB colors are often discussed in this disclosure, embodiments described herein are not limited to using red, green, and blue as primary colors. Other colors can also be used as the primary colors of NED system 400. In some embodiments, a display panel may use more than three primary colors.

In some embodiments, each pixel in the display panel 440 may correspond to a combination of at least three subpixels, for example, a red emitter, a green emitter, and a blue emitter. The subpixels forming an individual display pixel can be located on separate arrays. The emitters may be implemented as micro-LEDs. A micro-LED can be formed as a semiconductor structure including an active light emitting layer and other layers of semiconductor materials. The semiconductor layers may include different compound materials or a same base material with different dopants and/or different doping densities. For example, the semiconductor structure may include an n-type layer, an active region with one or more hetero-structures (e.g., one or more quantum wells), and a p-type layer. In some embodiments, each emitter has a mesa shape (e.g., with vertical, angled, or curved sidewalls) that encompasses at least some of the layers in the semiconductor structure. For example, an array of emitters may be formed through simultaneously etching mesas from a wafer comprising the various semiconductor layers.

Controller 420 is configured to synchronously control the light sources 442 to form an image for input to the projector 450. Depending on implementation, projector 450 may or may not include electronically controlled components. For example, in some embodiments, projector 450 may include lenses or optical elements that can be repositioned, e.g., to adjust focal length. Accordingly, controller 420 is also shown as forming an input to the projector 450. However, in other embodiments, the projector 450 may include only stationary optical elements or other components that do not require electronic control. Image source assembly 410 may generate and output image light to a waveguide display (not shown) such as the waveguide display 330. As described above, a waveguide display may receive the image light at one or more input coupling elements and guide the received image light to one or more output coupling elements. The input and output coupling elements may include, for example, a diffraction grating, a holographic grating, a prism, or any combination thereof. The input coupling element may be configured such that total internal reflection occurs within the waveguide display. The output coupling element may couple portions of the total internally reflected image light out of the waveguide display.

Controller 420 is configured to control the image rendering operations of image source assembly 410, such as the operations of light sources 442 and/or projector 450. For example, controller 420 may obtain instructions for image source assembly 410 to render one or more display images. The instructions may include display instructions and, in some embodiments, scanning instructions. In some embodiments, the display instructions may include an image file (e.g., a bitmap file). The controller 420 may receive the instructions as input from an external source, such as console 110 in FIG. 1. Alternatively, the controller 420 may be configured to generate the display and/or scanning instructions through processing the input from the external source. The display and/or scanning instructions may cause the display panel 440 to generate a display image using the light sources 442 and may include, for example, instructions that specify a type of a source of image light (e.g., monochromatic or polychromatic), a scanning rate, one or more illumination parameters, or any combination thereof.

Controller 420 may be implemented using hardware and/or software. In some embodiments, controller 420 may be a graphics processing unit (GPU) or another type of processor. The operations performed by controller 420 may include taking content for display and dividing the content into discrete sections. Controller 420 may provide the image source assembly 410 with scanning instructions that include an address corresponding to an individual emitter of the light sources 442 (e.g., a row address and/or column address) and/or an electrical bias applied to the individual emitter. Controller 420 may cause the light sources 442 to sequentially present the discrete sections using light emitters corresponding to one or more rows of pixels in an output image ultimately displayed to the user.

Image processor 430 may be a general-purpose processor and/or one or more application-specific circuits that are dedicated to performing the features described herein. In one embodiment, a general-purpose processor may be coupled to a memory to execute software instructions that cause the processor to perform certain processes described herein. In another embodiment, image processor 430 may be one or more circuits that are dedicated to performing certain image processing operations. While image processor 430 is shown as a stand-alone unit that is separate from controller 420 and driver circuit 444, image processor 430 may be a sub-unit of controller 420 or driver circuit 444 in other embodiments. In other words, the functionality of the controller 420, the image processor 430, and the driver circuit 444 may be combined into a single component (e.g., as a System on Chip) or distributed across different components that are communicatively coupled to each other. Additionally, as described below, some of the image processing may be performed by control logic (not shown in FIG. 4) that forms inputs to the display panel. For example, the display panel 440 may include control logic that generates input signals to the light sources 442 to supply the light sources 442 with foveated image data and/or to scan the light sources in order to form an output image.

Driver circuit 444 is configured to produce, either directly or with the aid of additional control logic, control signals for the light sources 442 based on data or instructions (e.g., display and scanning instructions) sent from the controller 420 or image processor 430. For example, the light sources 442 may emit light in accordance with one or more illumination parameters that are set by the controller 420 and potentially adjusted (e.g., in connection with foveation rendering) by image processor 430 and/or driver circuit 444. An illumination parameter may include, for example, drive voltage (e.g., a voltage applied to the gate terminal of a transistor coupled to an LED or other light emitter), emission current (e.g., a current flowing through a light emitter when the emitter is turned on), source wavelength, pulse rate (e.g., when using pulse-width modulation to control the intensity of emitted light), pulse amplitude, beam type (e.g., continuous or pulsed), other parameter(s) that may affect the emitted light, or any combination thereof.

Projector 450 may perform one or more optical functions, such as focusing, combining, or conditioning the light emitted by the light sources 442. Projector 450 may include one or more optical components that optically adjust and re-direct the light from light sources 442. For instance, the optical components of the projector 450 may expand, collimate, correct for one or more optical errors (e.g., field curvature, chromatic aberration), and/or perform other adjustments to condition the emitted light prior to supplying the light to the waveguide display. The optical components of projector 450 may include, for example, lenses, mirrors, apertures, gratings, or any combination thereof. Projector 450 may redirect emitted light via one or more reflective and/or refractive portions so that the emitted light is projected at certain orientations toward the waveguide display. The location where the emitted light is redirected toward the waveguide display may depend on specific orientations of the one or more reflective and/or refractive portions.

Figure 5:
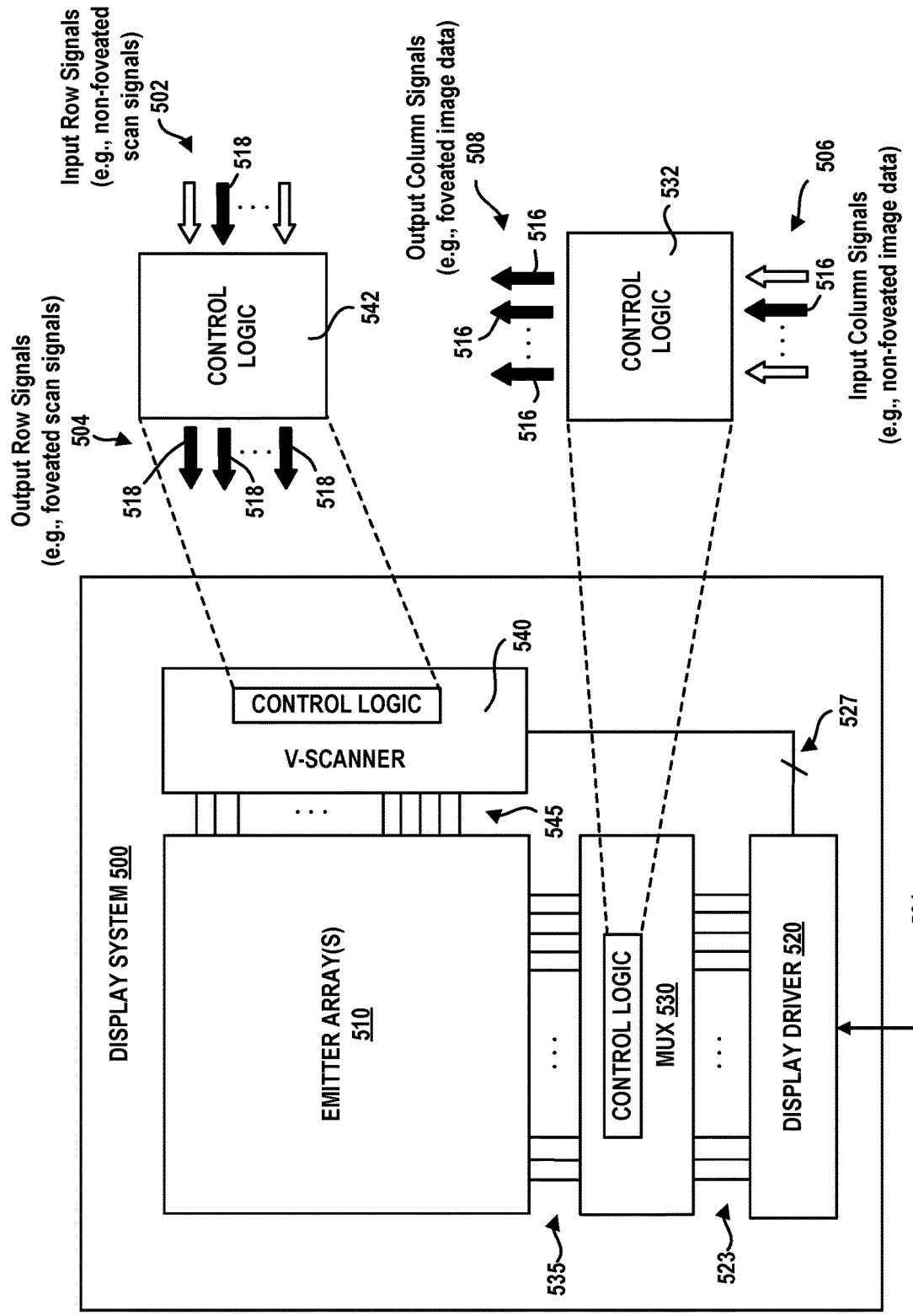
FIG. 5 is a block diagram of a display system that can be used to implement foveation in accordance with certain embodiments.

FIG. 5 is a block diagram of a display system 500 that can be used to implement foveation in accordance with certain embodiments. FIG. 5 is a simplified diagram depicting components that are relevant to signal processing in connection with foveation. Display system 500 is shown as including one or more emitter arrays 510, a display driver 520, a multiplexer (MUX) 530, and a vertical scanner (v-scanner) 540. However, the display system 500 may include additional or fewer components depending on implementation. For example, in some embodiments, the display system 500 may include projection optics (e.g., optics 214 in FIG. 2 or optics 320 in FIG. 3), a waveguide display, and/or other elements of the display systems and devices described above. Further, display system 500 may be configured to operate within an artificial reality system environment such as the artificial reality system environment 100 in FIG. 1. In some embodiments, the display system 500 may form a head-mounted display, e.g., the NED system 400 in FIG. 4.

Emitter array(s) 510 include one or more arrays of light emitters and may, for example, comprise at least red emitter array, at least one green emitter array, and at least one blue emitter array. As with the emitters in FIG. 3, the emitter arrays 510 can be implemented as micro-LEDs, although other types of light sources are possible. The emitter arrays 510 are configured to operate as pixels of a display and may, for example, correspond to the light sources 442 in FIG. 4.

As such, the emitter arrays 510 may collectively form a display panel operable to generate light that forms a display image.

Display driver 520 is analogous to the driver circuit 444 in FIG. 4 and may also incorporate the functionality of the image processor 430 and/or the controller 420. As shown in FIG. 5, display driver 520 receives image data 501 as input. The image data 501 may be supplied from an external source such as the console 110 in FIG. 1 or the image processor 430 (when implemented as a separate unit). In the example of FIG. 5, display driver 520 is communicatively coupled to the display (i.e., the emitter arrays 510) through the MUX 530 and the v-scanner 540 instead of being in direct communication with the display. Display driver 520 is configured to process the image data 501 for transmission to the emitter arrays 510 through the MUX 530.

Display driver 520 is further configured to generate control signals that govern the operation of the MUX 530 and the v-scanner 540. In particular, display driver 520 may output control signals that synchronize the supply of image data via the MUX 530 with vertical (e.g., row-by-row) scanning performed by the v-scanner 540, such that an output image is rendered using the emitter arrays 510. As such, the control signals generated by the display driver 520 may be used to execute display instructions and/or scanning instructions as described above with respect to FIG. 4.

Display system 500 is configured to render foveated output images. For example, display system 500 may be switched between different operating modes, including a full resolution mode where an output image is rendered at native resolution and a foveation mode where an output image is rendered with image areas having different resolutions. In some implementations, aspects of the foveation behavior of the display system 500 may be user-configurable. For example, a user viewing the display may program the display system to set the number of image areas having different resolution, the resolution of each image area, the size of each image area, and/or the like.

Display driver 520 may, in some instances, be configured to perform foveation operations. One example of a foveation operation is reducing the resolution of the output image corresponding to the image data 501 by eliminating certain data values and replacing the eliminated data values with duplicates of remaining data values. However, as discussed below, such work can be offloaded to the control logic 532, which may be configured to perform duplication in a way that saves power. Accordingly, in some embodiments, the role of the display driver 520 with respect to foveation may be limited to determining which areas of the output image are to be rendered with a lower resolution and which areas of the output image are to be rendered with a higher resolution. For example, display driver 520 may be configured to set the boundaries for at least two areas of the display image and to specify the resolution associated with each area. Display driver 520 may communicate information about each area of the output image (e.g., size, location, resolution, etc.) through outputting corresponding control signals together with outputting the image data 501 to the MUX 530. The image data and control signals can be sent through a set of signal lines 523 (e.g., a bus) that connect the display driver 520 to the MUX 530.

MUX 530 is configured to supply image data to the emitter arrays 510 through a set of signal lines 535. In some embodiments, the signal lines 535 may convey image data for an entire row of an output image at a time. For instance, the signal lines 535 may have sufficient bandwidth to transmit, in parallel, a separate data value for each column in one row of an emitter array. The data values are routed through the MUX 530 under the control of the display driver 520 and may correspond to illumination parameters which, as discussed above, can include drive voltage, emission current, source wavelength, pulse rate, pulse amplitude, beam type (continuous or pulsed), other parameter(s) that affect the emitted light, or some combination thereof. Thus, the data communicated by the signal lines 535 may form inputs to electronic components that ultimately drive the emitters in the emitter arrays 510. For example, each emitter may be implemented as a cell circuit comprising a micro-LED and one or more transistors that generate a drive voltage or current for the micro-LED based on the value of an illumination parameter.

As shown in FIG. 5, the MUX 530 may include control logic 532 that generates output column signals 508 from input column signals 506. The output column signals 508 may, in some instances, correspond to foveated image data transmitted to the emitter arrays 510 via the signal lines 535. The foveated image data is a lower-resolution form of the image data received from the display driver 520, e.g., the image data 501 after processing that can involve, among other things, combining data values for certain columns and/or certain rows. For example, the same image data value may be used for each pixel in an N×N or N×M block of pixels. In some embodiments, this combining of data values is performed by the control logic 532. As such, the input column signals 506 may correspond to non-foveated image data. For example, the display driver 520 may instruct the control logic 532 to select a data value 516 associated with a particular column of the output image and to duplicate the data value 516 for use as the image data for a group of adjacent columns (e.g., two or more columns in succession). In this way, the display driver 520 need not generate the foveated image data directly.

Additionally, the control logic 532 can be configured to generate foveated image data in a power-efficient manner. For example, instead of generating a separate signal for each output instance of the data value 516, the control logic 532 may short together the signal lines carrying the output column signals 508 for the group of adjacent columns. Thus, a shared signal may be asserted simultaneously on column lines coupled to different emitters, and the total number of image data signals communicated to the emitter arrays 510 may be reduced even though the number of physical signal lines 535 is fixed.

In the example of FIG. 5, image data is supplied through column lines (the signal lines 535). When image data is supplied through a column side of the display, emitters can be selected through scanning the emitter arrays 510 along the row dimension (e.g., a vertical direction). Accordingly, v-scanner 540 may be coupled to signal lines 545 that carry a separate scan signal for each row in an emitter array. The v-scanner 540 can use the scan signals to scan along the row dimension, e.g., in accordance with a raster scan pattern. For example, during full resolution mode, the v-scanner 540 may sequentially drive the signal lines 545 one line (row) at a time from top to bottom or from bottom to top. Each row of an emitter array (e.g., an array of red emitters) may be coupled to a corresponding signal line 545 so that every emitter in the row is selected when a scan signal asserted on the corresponding signal line. Likewise, emitters in corresponding rows of other emitter arrays (e.g., an array of green emitters and an array of blue emitters) may also be selected when the scan signal is asserted. Thus, the same row may be scanned concurrently across every emitter array of the emitter arrays 510. FIG. 5 shows a single v-scanner 540.

However, in some implementations the display system 500 may include more than one scanning unit. For example, a separate v-scanner could be provided to control the scanning of the left half of an emitter array while the v-scanner 540 controls scanning of the right half.

As shown in FIG. 5, the v-scanner 540 may include control logic 542 separate from the control logic 532 of the MUX 530. The control logic 542 may operate in synchronization with the control logic 532. In particular, the control logic 542 can combine scan signals in a manner similar to the combining of image data by the control logic 532. For example, the control logic 542 of v-scanner 540 may be configured to short together certain signal lines 545 as part of generating output row signals 504 corresponding to foveated scan signals. In the example shown, control logic 542 duplicates a scan signal 518 as a shared scan signal for a group of adjacent rows (e.g., two or more rows in succession). The control logic 542 may combine scan signals based on instructions from the display driver 520. As such, the control logic 542 may be controlled using a set of signal lines 527 that connect the display driver 520 to the v-scanner 540. The display driver 520 may use the signal lines 527 to send control signals that determine which scan signals are to be combined and/or when to combine particular scan signals. In some implementations, the control signals sent to the control logic 542 may carry information that is also carried by control signals sent to the control logic 532. For example, the display driver 520 may use the signal lines 527 to communicate information about each area of the output image (e.g., size, location, resolution, etc.). Thus, the timing of the signals generated by the control logic 532 and the control logic 542 may be determined, at least in part, by the display driver 520.

When multiple rows are scanned at the same time as part of a combined scanning operation based on a shared scan signal, less power may be consumed with respect to charging of data lines that carry image data (e.g., signal lines 535) along these combined rows. This is because the image data only needs to be written once for these combined rows. Additionally, the total scanning time for scanning the combined rows may be reduced since only one scan cycle (corresponding to the amount of time taken to scan a single row) can be used to scan the combined rows.

Figures 6A, 6B:
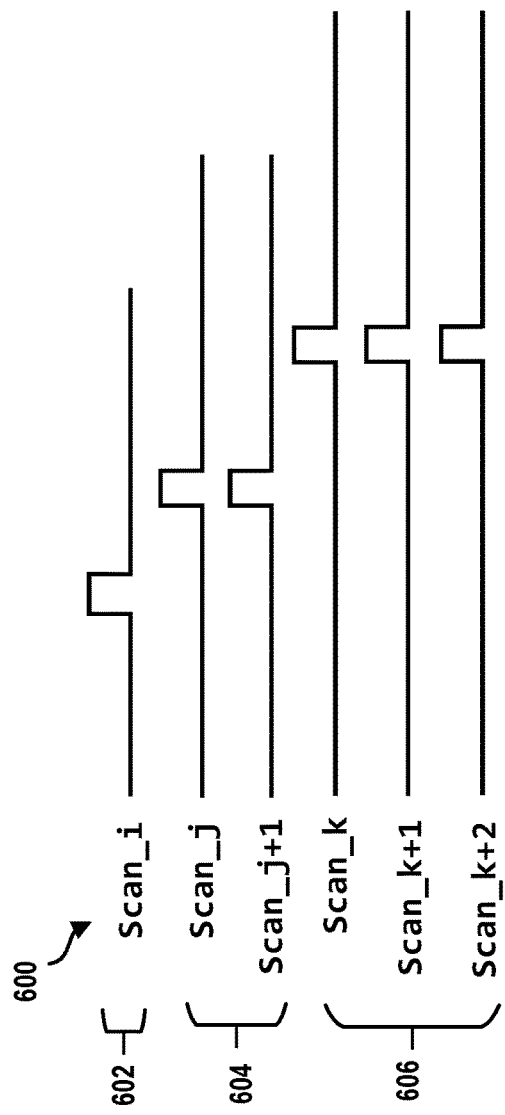
FIG. 6A shows an example of scan signals associated with a foveated image, according to certain embodiments.
FIG. 6B shows an example of image data associated with a foveated image, according to certain embodiments.

FIG. 6A shows an example of scan signals associated with a foveated image, according to certain embodiments. In FIG. 6A, an output image is formed using scan signals 600, which are ultimately combined into three separate scan signals. A first scan signal 602 is provided to only one row (i) because row i corresponds to an area of the output image that is rendered at full resolution. A second scan signal 604 is provided to two rows (j and j+1) corresponding to an area that is rendered at a lower resolution. The scan signal 604 is output through a pair of corresponding scan lines (e.g., two of the signal lines 545 in FIG. 5). Although scan signal 604 is output on separate physical lines, the scan signal 604 can be generated as a shared signal, e.g., by shorting together the scan line coupled to row j and the scan line coupled to row j+1. Thus, a scan signal specified for one of the two rows (either row j or row j+1) may be duplicated onto the pair of scan lines to scan row j and row j+1 simultaneously. A third scan signal 606 is provided to three rows (k, k+1, and k+2) corresponding to an area that is rendered at an even lower resolution. The scan signal 606 can be a scan signal specified for one of the three rows (k, k+1, or k+2) and which is duplicated twice for the purpose of scanning all three rows simultaneously.

FIG. 6B shows an example of image data associated with a foveated image, according to certain embodiments. In FIG. 6B, an output image is formed using image data 610, which includes both foveated and non-foveated data. The image data 610 can be input to a display panel (e.g., one or more emitter arrays) in synchronization with the scan signals 600 in FIG. 6A to produce an output image having three areas of different resolutions. A first set of image data 612 corresponds to illumination parameters for row i and can, for example, include data values (e.g., di1 to di8) that determine the brightness of eight successive emitters in row i. A second set of image data 614 corresponds to illumination parameters for rows j and j+1. Further, a third set of image data 616 corresponds to illumination parameters for rows k, k+1, and k+2. Unlike the second set of image data 614 and the third set of image data 616, the first set of image data 612 includes a separate (column-specific) value for each column in row i. As such, the first set of image data 612 is non-foveated.

The second set of image data 614 includes image data that has been specified for row j, but which is reused as the image data for row j+1 instead of supplying row j+1 with its own data values. Further, each value in the second set of image data 614 is duplicated across two columns within a given row. For example, the first two emitters in row j are driven using a data value dj 1, the next two emitters in row j are driven using a data value dj2, and so on. Similarly, the first two emitters in row j+1 are driven using dj 1, the next two emitters in row j+1 are driven using dj2, and so on. Therefore, the image resolution can be reduced by duplicating data values across adjacent rows (j and j+1) as well as across adjacent columns in the same row, e.g., through repeating the same data value every other column. Accordingly, the image area corresponding to rows j and j+1 has reduced image resolution along both the row dimension and the column dimension. However, in some instances, the image data may be duplicated across rows without any intra-row duplication, so that the image resolution is not reduced along the column dimension. Likewise, it is also possible to duplicate image data across columns without duplicating across rows.

The third set of image data 616 includes image data that has been specified for row k, but which is reused as the image data for row k+1 and row k+2. As with the second set of image data 614, the image data is also duplicated across adjacent columns in the same row. For example, the first three emitters in row k are driven using a data value dk1, the next three emitters in row k are driven using a data value dk2, and so on. Accordingly, the image area corresponding to rows k, k+1, and k+2 has reduced image resolution along both the row dimension and the column dimension compared to the image area corresponding to rows j and j+1. Alternatively, as discussed above with respect to the second set of image data 614, the image data in the third set of image data 616 may be duplicated across rows only or across columns only.

Based on the discussion of FIGS. 5, 6A and 6B above, it is understood that one or more scan signals and/or one or more data signals can be generated as a shared signal for input to an emitter array, and that such signals may be generated by control logic coupled to the row and/or column side of the emitter array. Further, it should be apparent that scanning of the emitter array can be performed in synchronization with the supplying of image data to the emitter array in connection with forming an output image. Accordingly, in some instances a shared scan signal may be used to scan multiple rows of the emitter array in combination with a shared data signal carrying information representing an illumination parameter, in order to cause the emitter array to produce light for a reduced resolution area of the output image. As discussed above, such synchronous control may be performed under the direction of the display driver 520. Additionally or alternatively, the control logic responsible for generating the scan and data signals may coordinate the timing of the scan and data signals. Thus, control logic 532 and 542 may be in communication with each other in some embodiments. Further, in some embodiments, control logic 532 and 542 may be integrated into a single control unit.

Figure 7B:
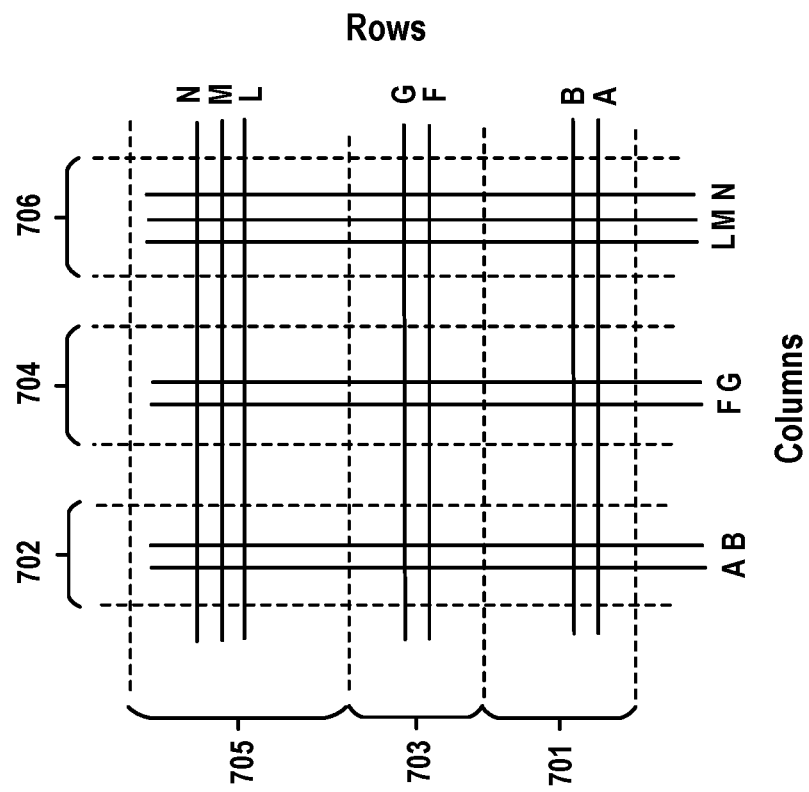
FIG. 7B shows an example of how the foveated image in FIG. 7A may be generated through synchronization between scanning and supply of image data, according to certain embodiments.
Figure 7A:
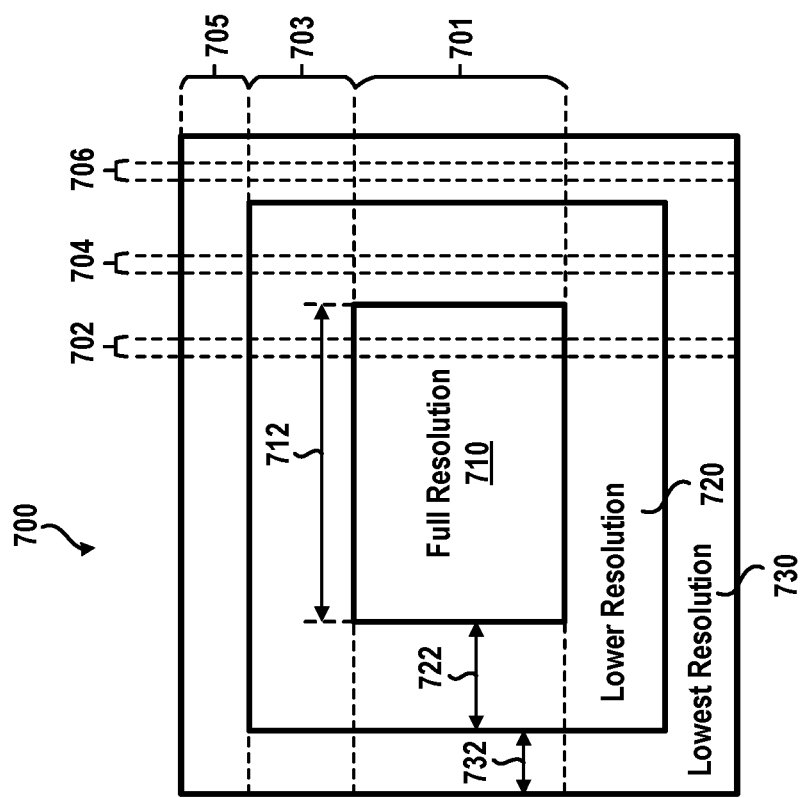
FIG. 7A shows an example of a foveated image according to certain embodiments.

FIG. 7A shows an example of a foveated image 700, according to certain embodiments. The foveated image 700 includes a first area 710, a second area 720, and a third area 730. The first area 710 is full resolution, e.g., rendered at the native resolution of the display or with the same resolution as an input image. The first area 710 is depicted as being centered within the image 700 for illustration purposes. However, as discussed below, the locations of the areas having different resolution can vary when foveation is performed based on eye-tracking.

The second area 720 is lower in resolution than the first area 710 and corresponds to a region that is closer to the periphery of the image 700. As shown in FIG. 7A, the second area 720 forms a frame or border surrounding the first area 710. Therefore, some of the rows and columns corresponding to the first area 710 also belong to the second area 720. With appropriate (e.g., synchronized) scanning and input of image data, both areas 710 and 720 can be rendered at their respective resolutions even though the row and column ranges spanned by the first area 710 partially overlap the row and column ranges spanned by the second area 720.

The third area 730 has the lowest resolution among the three areas 710, 720, and 730. As shown, the third area 730 surrounds the second area 720 in a similar manner to how the second area 720 surrounds the first area 710. In this configuration, the third area 730 forms a frame or border around the second area 720. In the example shown, a width 712 of the first area 710 is larger than a width 722 of the second area 720, which is in turn larger than a width 732 of the third area 730. However, the dimensions of the areas 710, 720, and 730 can vary depending on how the areas have been configured. The areas 710, 720, and 730 are shown as being rectangular, but other shapes are also possible. For example, image areas may be circular or elliptical in some embodiments. Further, the size of each image area does not need to be radially uniform. As discussed below in connection with FIGS. 8A and 8B, the size and/or position of an image area can change depending on eye movement.

Additionally, the total number of image areas can vary. FIG. 7A shows three image areas (710, 720, and 730). However, a foveated image can include as few as two image areas or more than three image areas (e.g., five or six, in some embodiments). Further, it is not necessarily the case that each image area has a different resolution, i.e., a resolution different from that of all other areas. In some embodiments, two or more areas of an output image may be rendered at the same resolution.

FIG. 7A illustrates the importance of not rendering a foveated image in a static manner. If the foveated image 700 is rendered during a time when the user is focused on the center of the image, i.e., at a point within the first area 710, the user will have a good viewing experience since the image quality of the first area 710 is relatively high. However, if the user later switches focus to a point within the second area 720 or the third area 730, the image quality will be lower, and thus the viewing experience may worsen. To address this issue, eye-tracking may be performed in some embodiments to modify one or more attributes (e.g., the size, shape, and/or location) of the image areas so that the area around the focus point remains high resolution as the focus point moves.

FIG. 7B shows an example of how the foveated image 700 may be generated through synchronization between scanning and supply of image data. FIG. 7B shows row lines and column lines for a portion of the image 700. The row lines may correspond to the signal lines 545 in FIG. 5. The column lines may correspond to the signal lines 535. Each row line may be associated with a corresponding row of an emitter array. Likewise, each column line may be associated with a corresponding column of the emitter array. As such, the signal lines in FIG. 7B are referred to by their corresponding rows and columns for the sake of simplicity. That is, the row lines are simply referred to as rows, and the column lines are referred to as columns.

As shown in FIG. 7A, the image areas overlap along the row direction. For instance, the first area 710 spans a row range 701 that also belongs to the second area 720 and the third area 730. Similarly, the second area 720 spans a row range 703 that belongs to the third area 730. In contrast, the third area 730 spans a row range 705 that does not overlap with rows in any of the other image areas. In some embodiments, scanning of overlapping rows is performed based on the scan rate of the highest resolution area among the overlapping rows. For example, each row in the row range 701 may be scanned individually, e.g., one at a time, using separate scan signals for rows A and B. Assume that the resolutions of the second area 720 and the third area 730 are set by combining two adjacent rows and three adjacent rows, respectively. Each row in the row range 703 may be scanned in pairs, e.g., using a shared scan signal for rows F and G. Similarly, each row in the row range 705 may be scanned in groups of three, e.g., using a shared scan signal for rows L, M, and N.

When scanning across the row range 701, a mix of foveated and non-foveated image data may be supplied via the column lines. For example, when row A is scanned, separate (non-foveated) image data may be provided to columns A and B, using different data signals, since these columns correspond to a column range 702 in the first area 710. At the same time, a shared data signal may be used to supply foveated image data for columns F and G since these columns correspond to a column range 704 in the second area 720. Similarly, a shared data signal may be used to supply foveated image data for columns L, M, and N since these columns correspond to a column range 706 in the third area 730. Row B may be scanned after scanning of row A is completed. When row B is scanned, the image data for columns A and B is updated but again supplied using different data signals. As with the scanning of row A, a shared data signal can be used to supply foveated image data for columns F and G (e.g., the same data value supplied to columns F and G when row A was scanned), and another shared data signal can be used to supply foveated image data for columns L, M, and N (e.g., the same data value supplied to columns L, M, and N when row A was scanned).

Row range 703 does not belong to the first area 710. Therefore, only foveated image data may be supplied when scanning across the row range 703. For example, rows F and G may be scanned at the same time using a shared scan signal. When rows F and G are scanned, a shared data signal can be used for columns A and B (the second area 720), another shared data signal for columns F and G (also the second area 720), and yet another shared data signal for columns L, M, and N (the third area 730).

Row range 705 only belongs to the third area 730. As such, rows L, M, and N may be scanned at the same time using a shared scan signal. When rows L, M, and N are scanned, a shared data signal can be used for columns A and B plus another column in a three-column group (e.g., a column C, not shown), another shared data signal for columns F and G plus another column in a three-column group (e.g., a column H, not shown), and yet another shared data signal for columns L, M, and N.

As indicated in the example just described, combining image data for both rows and columns may involve coordination between the signals on the row side and the signals on the column side so that scanning and supply of image data are properly synchronized. Further, it should be apparent that a greater degree of coordination may be required when there is overlap between regions of different resolution along the scan direction. In some embodiments, the implementation complexity of the control logic can be reduced by having a display controller generate the foveated image data for some portions of the output image. For example, if the display system 500 is used to generate the image 700, an image processor or the display driver 520 itself could supply foveated image data for columns F and G when row A is being scanned. This would free the control logic 532 from having to generate the foveated image data for columns F and G during the scanning of row A, but at the cost of additional power consumption. Likewise, the image processor or display driver could also supply foveated image data for columns L, M, and N when row A is scanned.

Figure 8B:
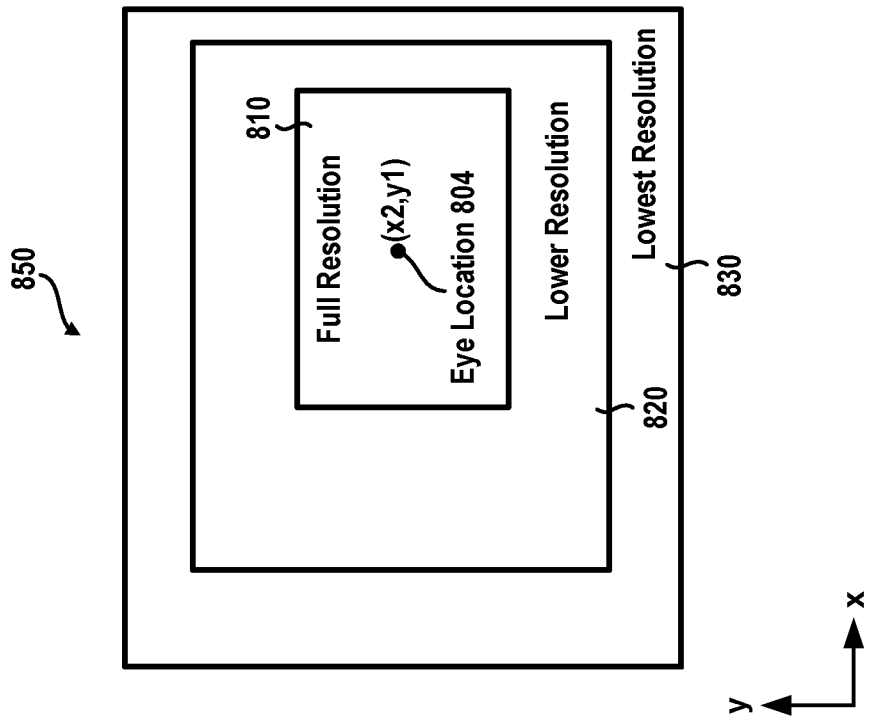
FIGS. 8A and 8B show examples of foveated images generated using eye-tracking, according to certain embodiments.
Figure 8A:
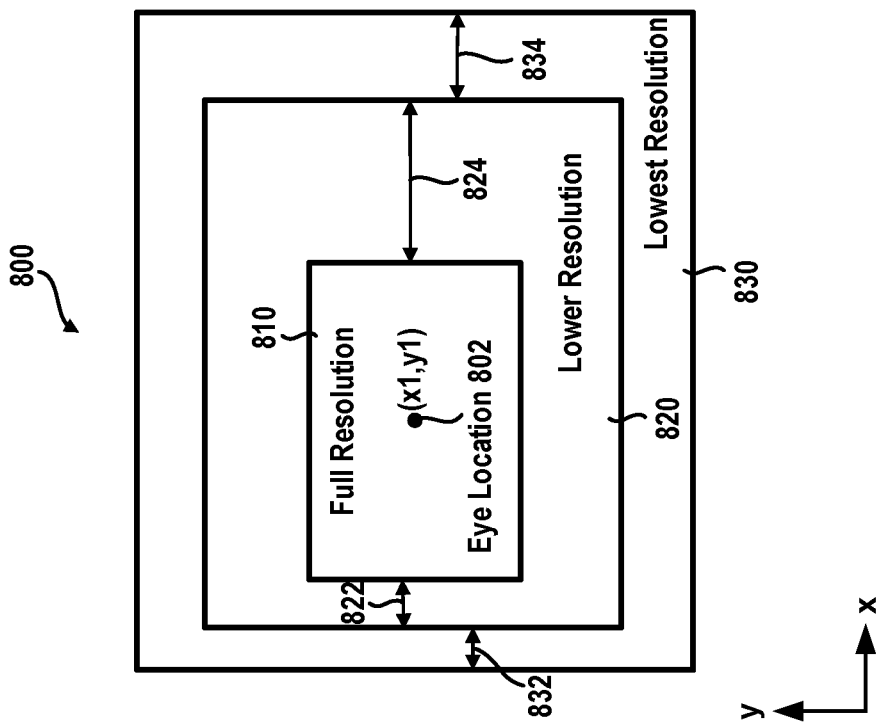

FIGS. 8A and 8B show examples of foveated images generated using eye-tracking, according to certain embodiments. In FIG. 8A, a foveated image 800 includes a first area 810, a second area 820, and a third area 830, which are similar to the first area 710, the second area 720, and the third area 730 in FIG. 7A, respectively. As shown, the first area 810 has full (or highest) resolution, the second area 820 has a lower resolution, and the third area 830 has the lowest resolution. Further, the second area 820 surrounds the first area 810 and is, in turn, surrounded by the third area 830. The image 800 is rendered at a time when a user's eye location 802 is roughly centered along the vertical direction (the y-axis) but slightly left of center along the horizontal direction (the x-axis). As shown in FIG. 8A, the eye location 802 corresponds to a focus point with coordinates (x1, y1), which may be expressed, for example, in terms of display pixel coordinates. The first area 810 is approximately centered about the eye location 802. That is, the middle of the first area 810 is equal or close to the focus point (x1, y1).

In the example of FIG. 8A, the first area 810 is approximately the same size as the first area 710, the second area 820 is approximately the same size as the second area 720, and the third area 830 is approximately the same size as the third area 730. However, because the eye location 802 is slightly shifted to the left with respect to the center of the image, the areas 810, 820, and 830 are also shifted left. As shown, each of the areas 810, 820, and 830 is closer to the left side of the image 800. Consequently, a width 822 along the left side of the second area 820 is smaller than a width 824 along the right side of the second area. Similarly, a width 832 along the left side of the third area 830 is smaller than a width 834 along the right side of the third area 830.

FIG. 8B shows a foveated image 850 rendered at a time when a user's eye location 804 is roughly centered along the vertical direction but slightly right of center along the horizontal direction. As shown in FIG. 8B, the eye location 804 corresponds to a focus point with coordinates (x2, y1). Thus, the eye location 804 represents an eye movement toward the right side of the display. The image 850 may be rendered sometime after the user's eye has moved from the location 802 to the location 804, so that the image 800 and the image 850 form a sequence of images presented to the user. The image 850 may, but need not, correspond to the same input image as the image 800. In some instances, a subsequent output image (e.g., image 850) may be rendered through processing the same image data used for an earlier output image (e.g., image 800) such that the subsequent output image represents the same image content but with a different configuration of resolution areas.

The subsequent output image can be generated based on the original input image or based on image data representing an earlier output image. For example, in some embodiments, the control logic 532 may include a memory buffer that stores the most recent set of foveated image data and/or the most recent set of non-foveated image data. Accordingly, the control logic of the display system 500 can be configured to produce different versions of an input image without requiring the display driver 520 to resupply the image data for the input image.

It is possible for multiple output images to be based on the same input image because the frame rate and refresh rate of the display are usually higher than the speed with which the user's eye moves. For example, the display may operate at 30 frames per second (fps) or faster (e.g., 60 fps) and using a refresh rate of 60 hertz (Hz) or 120 Hz. Thus, the same input image may sometimes be displayed consecutively. In other instances, the subsequent output image may be based on a different input image. Thus, the image 850 could be generated using different image data than the image data used to generate the image 800.

As shown in FIG. 8B, when the user's eye moves to location 804, the highest resolution area (810) follows correspondingly. Thus, the center of the first area 810 (or some other reference point within area 810) may remain relatively fixed with respect to the focus point of the user's eye. Similar to the example in FIG. 8A, the other image areas are also shifted based on the eye location. In FIG. 8B, the second area 820 and the third area 830 are each shifted to the right. Accordingly, based on the examples of FIGS. 8A and 8B, it will be understood that the image areas can be reconfigured (e.g., moved) to keep higher resolution areas closer to the focus point of the user's eye and to keep lower resolution areas farther away from the focus point.

Additionally, as mentioned above, it may also be possible to change the size, shape, or other attribute of an image area. Such changes may also be performed based on eye-tracking. For example, in some embodiments, the highest resolution area (e.g., area 810) may be gradually decreased in size when the user's eye remains stationary over a period of time. As another example, instead of moving the entire first area 810, the first area 810 could be widened toward the direction of eye movement (e.g., expanded to encompass both the eye location 802 and the eye location 804) and then narrowed to exclude the earlier eye location (e.g., location 802) in response to determining that the user's eye has remained focused on or around the new eye location (e.g., location 804) for a threshold period of time. This could potentially improve the viewing experience in situations where the user is switching back and forth between eye locations.

In some embodiments, one or more any aspects of foveation may be configured based on user preferences. For example, the display system 500 may permit the user to specify the total number of image areas, the size of each area, and/or the resolution of each area. In one example, the display system 500 may be preconfigured with default settings for different viewing scenarios, including a first setting where the size of the highest resolution area is larger compared to the size of the highest resolution area in a second setting. For example, the first setting may define a viewing angle of ±30° for the first area 810, whereas the second setting may define a viewing angle of ±20° for the first area 810. The first setting may be a recommended setting for viewing movies or playing video games, whereas the second setting may be recommended for reading text documents or web browsing. The display system 500 may permit the user to switch between the default settings. Further, the display system 500 may provide, e.g., through a graphical user interface, an option to manually configure the size of one or more image areas or perform some other customization. For example, the display system 500 may display a box representing the boundary of each image area and permit the user to resize and/or reposition the boxes, e.g., using a drag-and-drop operation. The display system 500 may convert the user's input into corresponding configuration setting values, for example, through mapping the size of a user-configured image area to a corresponding viewing angle and capturing pixel coordinates associated with the user-configured image area (e.g., the location of a corner or midpoint). As such, the user may be able to specify the size and/or position of a higher resolution area relative to the size and/or position of a lower resolution area. For instance, the user could set the ratio between the size of the area 810 and the size of the area 820 such that the area 810 has a different pixel count (higher or smaller) than the area 820.

FIG. 9 shows an example of a foveated image 900 rendered at a time when a user's eye is focused near an edge of a display, according to certain embodiments. In FIG. 9, eye location 902 corresponds to a focus point with coordinates (x3, y3) and is in close proximity to the upper left corner of the display. As with the example images in FIGS. 8A and 8B, the image 900 is divided into three areas: a first area 910, a second area 920, and a third area 930. The first area 910 has full (or highest) resolution, the second area 920 has lower resolution, and the third area 930 has the lowest resolution. Unlike FIGS. 8A and 8B, the area with the highest resolution (910) is not completely surrounded by a lower resolution area. Because the eye location 902 is near the upper left corner, the first area 910 extends all the way to the top edge and the left edge of the image 900. Therefore, only the right and bottom sides of the first area 910 are surrounded, in this example by the second area 920. The third area 930 surrounds the right and bottom sides of the second area 920. Accordingly, the spatial relationship between the first area 910 and the second area 920 is similar to the spatial relationship between the second area 920 and the third area 930, but this could change depending on eye movement.

The examples in FIGS. 7A, 8A, 8B, and 9 depict images in which higher resolution areas are nested within lower resolution areas. Although the image resolution generally decreases toward the periphery of the output image, it is not necessary that the output image follows a strict nesting pattern. For example, in some embodiments, a higher resolution area (e.g., area 910) may be surrounded by a mix of lower resolution areas. Thus, the second area 920 and/or the third area 930 could each be divided into sub-areas with different resolutions. For example, the second area 920 could be composed of sub-areas that alternate between a first resolution and a second resolution, with the first resolution and the second resolution being lower than the resolution of the first area 910.

Additionally, in some embodiments, multiple image areas may be rendered at full or highest resolution. For example, the display system 500 may determine, based on eye-tracking and/or analysis of the content of an input image (e.g., object detection using a computer vision algorithm or artificial intelligence), that another location in the image 900 is visually significant. In one example, the display driver 520 or an image processor may obtain eye-tracking results indicating that the user tends to focus on a second location outside of the first area 910. The second location may be a location that the user has a pattern of revisiting over the course of the same input image being repeatedly displayed (e.g., static image content) or over the course of several input images. As such, the display driver 520 or image processor may determine an area of interest around the second location for rendering at a higher resolution compared to the resolution of the second area 920 or the third area 930 (e.g., at the same resolution as the first area 910). Therefore, eye-tracking results may be applied to determine an area of interest around the current eye location of the user (e.g., area 910) and to determine one or more additional areas of interest to be rendered at a higher resolution relative to surrounding areas.

Figure 10:
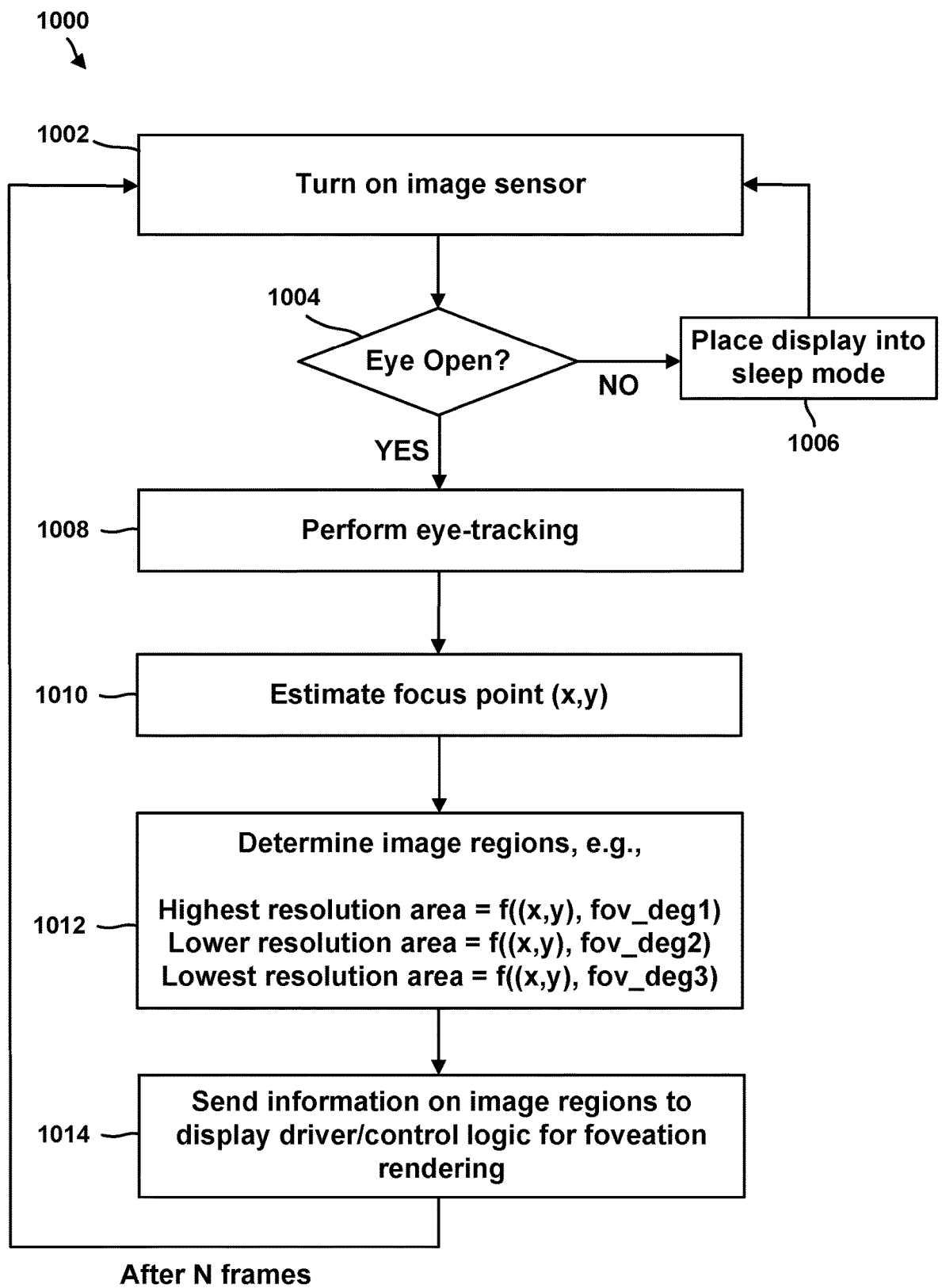
FIG. 10 is a flow diagram of a process for generating a foveated image using eye-tracking, according to certain embodiments.

FIG. 10 is a flow diagram of a process 1000 for generating a foveated image using eye-tracking, according to certain embodiments. Process 1000 can be performed using a display system equipped with an eye-tracking unit. In some instances, the display system performing the process 1000 may be a near-eye display in an artificial reality system environment, such as the near-eye display 120 in FIG. 1. The functionality described with respect to FIG. 10 can be implemented using one or more processing units that direct the rendering of an output image by driving the display of the display system using image data and control signals. In some embodiments, one or more steps of process 1000 may be performed by processing units that form a display driver and/or associated control components. For example, process 1000 can be implemented using image processor 430, driver circuit 444, and/or controller 420 as described with respect to FIG. 4. In some embodiments, the display system performing process 1000 may correspond to the display system 500 in FIG. 5, in which case at least some of the processing may be performed using control logic communicatively coupled to a display driver (e.g., control logic 532 and control logic 542).

At block 1002, an image sensor is turned on to capture one or more images of an eye of a user. The image sensor may, for example, be a complementary metal-oxide-semiconductor (CMOS) image sensor that is part of the eye-tracking unit 130 in FIG. 1. The image sensor does not need to be continuously on but may instead be configured to periodically capture images of the user's eye. In particular, the image sensor may operate at a slower frame rate than the display (e.g., 30 fps versus 60 fps). In some embodiments, the image sensor may capture both eyes of the user in a single image. Alternatively, a separate image sensor may be provided for each eye. The image sensor can be turned off between capture operations to conserve power.

At block 1004, the image(s) captured by the image sensor are processed to determine whether the user's eye is open. This determination can be performed by the eye-tracking unit or some other component in communication with the eye-tracking unit (e.g., by the image processor 430 in FIG. 4). If the user's eye is closed, then the process 1000 proceeds to block 1006, where the display is placed into a sleep mode to conserve power. Putting the display into sleep mode may turn off the light sources (e.g., micro-LEDs) of the display. If the user's eye is open, the process proceeds to block 1008.

At block 1008, the eye-tracking unit performs eye-tracking to monitor the movement of the user's eye. In general, eye-tracking involves one or more types of eye measurements, for example, measurements related to fixations, where the user's gaze remains fixed on a single location. Eye measurements may also include measurements of saccades, which are rapid eye movements that occur between fixations. Saccade-related parameters may include, for example, saccade number, amplitude, velocity, acceleration, and fixation-saccade ratio. Eye measurements may also include measurements of scan path, which comprise a series of short fixations and saccades alternating before the eyes reach a target location on the display screen. Movement measures derived from scan path may include, for example, scan path direction, duration, length, and area covered. The eye movement measurements may further include measuring the sum of all fixations made in an area of interest before the eye leaves that area or the proportion of time spent in each area. The eye measurements may also include measuring pupil size and blink rate. Accordingly, the eye-tracking in block 1008 can involve characterizing the user's eye behavior (e.g., to predict the next eye movement).

At block 1010, a focus point is estimated based on the eye-tracking in block 1008. The focus point may correspond to a location on which the user's eye is currently fixated. The focus point can be estimated as being a particular pixel or pixel region and can be expressed in terms of pixel coordinates. In some embodiments, the eye-tracking unit may perform the estimation to provide the focus point as an input to a display controller or image processor (e.g., image processor 430).

At block 1012, a set of image regions is determined. Each image region corresponds to an area within a foveated image to be rendered on the display. For example, the boundaries of each of the areas 710, 720, and 730 in FIG. 7A may be determined by the image processor 430 or the driver 444 in FIG. 4. As shown in FIG. 10, each image region can be determined as a function of the coordinates of the focus point and a corresponding viewing angle or field of view (fov). For example, the highest resolution region (e.g., area 710) may span a viewing angle of ±15°, the next highest resolution region (e.g., area 720) may span a viewing angle of ±30°, and the lowest resolution region (e.g., area 730) may span a viewing angle of ±90°.

At block 1014, information about the image regions determined in block 1012 is communicated to a display driver or to control logic associated with the display driver. For example, in embodiments where the image regions are determined by an image processor, the image processor may send information describing the boundaries of each image region to a display driver so that the display driver can generate control signals accordingly. Based on the information communicated in block 1014, the display driver and/or control logic can drive the display to form a foveated output image having the regions determined in block 1012. The process 1000 can be repeated periodically (e.g., after a certain number of display frames) to generate additional foveated output images based on updated eye information.

Figure 11:
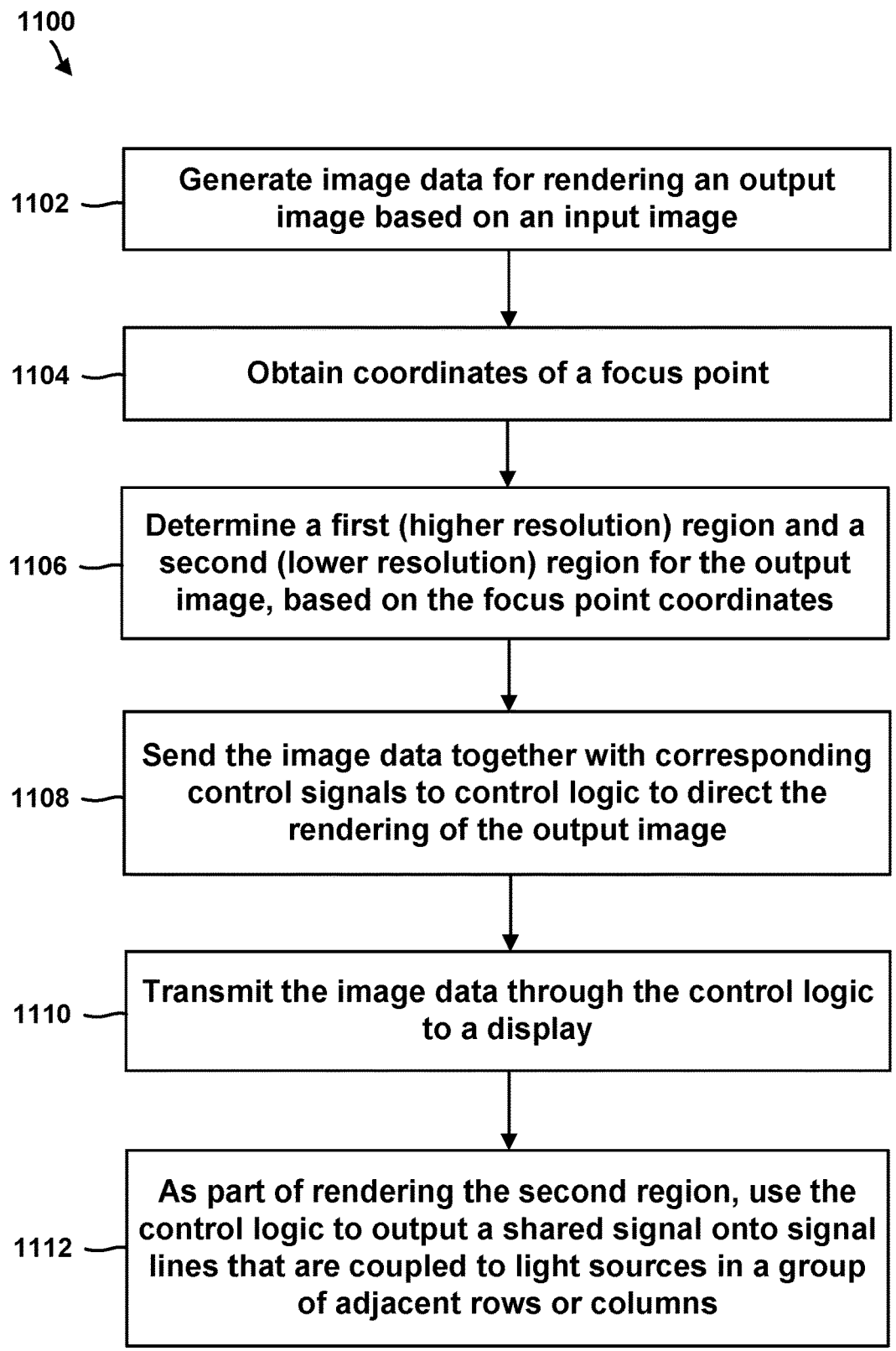
FIG. 11 is a flow diagram of a process for generating a foveated image with the aid of control logic, according to certain embodiments.

FIG. 11 is a flow diagram of a process 1100 for generating a foveated image with the aid of control logic, according to certain embodiments. In some instances, the display system performing the process 1100 may be a near-eye display in an artificial reality system environment, such as the near-eye display 120 in FIG. 1. The functionality described with respect to FIG. 11 can be implemented using one or more processing units that direct the rendering of an output image by driving the display of the display system using image data and control signals. In some embodiments, one or more steps of process 1100 may be performed by processing units that form a display driver and/or associated control components. For example, process 1100 can be implemented using image processor 430, driver circuit 444, and/or controller 420 as described with respect to FIG. 4. In some embodiments, the display system performing process 1100 may correspond to the display system 500 in FIG. 5, in which case at least some of the processing may be performed using control logic communicatively coupled to a display driver (e.g., control logic 532 and control logic 542). The process 1100 incorporates functionality described above with respect to the process 1000 in FIG. 10 but can be performed separately or in combination with the process 1000.

At block 1102, image data is generated for use in rendering an output image based on an input image. For instance, an image processor or display driver may receive instructions from a CPU of a host computer system (e.g., console 110 in FIG. 1) to present the input image using the display. The input image may be encoded in a digital format. As such, the image processor or display driver may, as part of generating the image data, parse the contents of the input image and perform one or more digital image processing operations such as decoding, decompression, color correction, and/or the like in preparation for rendering the input image as a display image. The image data may include one or more types of illumination parameters that are communicated to the display in the form of electrical signals used to drive the light sources of the display. For example, the image data generated in block 1102 may correspond to non-foveated image data that is supplied to the column side of a display as shown in FIG. 5.

At block 1104, the coordinates of a focus point are obtained. The focus point can be determined based on eye-tracking, for example, in accordance with the functionality of blocks 1002-1010 in FIG. 10. The focus point can be a screen or display image location on which one or more of the user's eyes is fixated. For example, in an embodiment where the display is a single panel viewed by both eyes, the focus point may be determined through tracking both eyes to determine a gaze direction and mapping the gaze direction to a screen location. The display controller may compute the coordinates of the focus point based on results of the eye-tracking. Alternatively, as discussed above, the focus point coordinates can be supplied as an input to the display controller.

At block 1106, a first region and a second region are determined for the output image based on the coordinates of the focus point. The first region is an image area that will be rendered at a higher resolution compared to the second region. For example, the first region may correspond to the image area 810 in FIG. 8A, which is located around the focus point having coordinates (x1, y1). The discussion of the process 1100 is limited to two image regions for simplicity. However, as indicated above, the total number of image regions can be greater. Determining the first and second image regions may involve setting the boundaries for each region relative to the focus point. The determination of the boundaries may include determining positions for each region (e.g., x, y coordinates corresponding to the midpoint/center of the image area 810). Typically, the midpoint of the highest resolution area (e.g., image area 810) is the same as the focus point, with the midpoint of a lower resolution area (e.g., image area 820) also being the focus point or offset from the focus point depending on eye location. However, it is not strictly required that the midpoint of any image area (including the highest resolution area) coincides with the focus point. As such, the midpoint of the image area 810 could be computed as an offset in the x and/or y direction relative to the eye location 802 (x1, y1) in FIG. 8A. Additionally, in some embodiments, the boundaries may be determined based on settings stored in association with each region. For example, in block 1012 of FIG. 10, a separate viewing angle may be stored for each image region. In some instances, settings relating to image regions may be user-configured.

At block 1108, the image data that was generated in block 1102 is sent together with corresponding control signals to the control logic. The image data and control signals may be sent from a display driver such as the display driver 520 in FIG. 5. The control signals are configured to cause the control logic to render the output image using appropriate data and scan signals. The control signals received by the control logic may identify each image region. For example, the control signals may indicate which of rows and columns are to be combined for each low resolution region (e.g., the second region). The control signals may also indicate a boundary of each image region and/or other aspects of the image regions (e.g., size and shape). As such, the control signals may include signals that direct the control logic to transmit a subset of the image data from block 1102 to the display, as a lower resolution (foveated) version of the input image.

At 1110, the image data generated in block 1102 or, more specifically, the image data after reformatting to correspond to the foveated version of the input image, is transmitted through the control logic to the display. In the example of FIG. 5, the image data can be transmitted using the control logic 532 in conjunction with the scanning performed by the control logic 542.

At block 1112, as part of rendering the second region, the control logic may, e.g., in response to the control signals sent in block 1108, output a shared signal onto signal lines that are coupled to light sources in a group of adjacent rows or columns. As discussed above, the shared signal can be a column signal that carries image data or a shared scan signal. Both types of shared signals may be used to render the second region. Therefore, the control signals sent to the control logic in block 1108 may include signals indicating the timing with which scan signals are to be output to the display, e.g., in synchronization with the column signals carrying image data. The scan signals may operate to select which rows of the display will receive the incoming data carried by the column signals at any given time. In this manner, the output image can be rendered over the course of a sequence of scan operations in which foveated image data is supplied to drive light sources that belong to the second region. Likewise, the control logic may use shared signals in connection with supplying foveated image data to drive light sources that belong to the first region if the first region is to be rendered at less than full resolution, e.g., lower than the resolution of the input image or the native resolution of the display.

The embodiments described herein may be used in conjunction with various technologies. For example, embodiments may be used in an artificial reality system environment, as discussed above. An artificial reality system, such as a head-mounted display (HMD) or heads-up display (HUD) system, generally includes a display configured to present artificial images that depict objects in a virtual environment. The display may present virtual objects or combine images of real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

Figure 12:
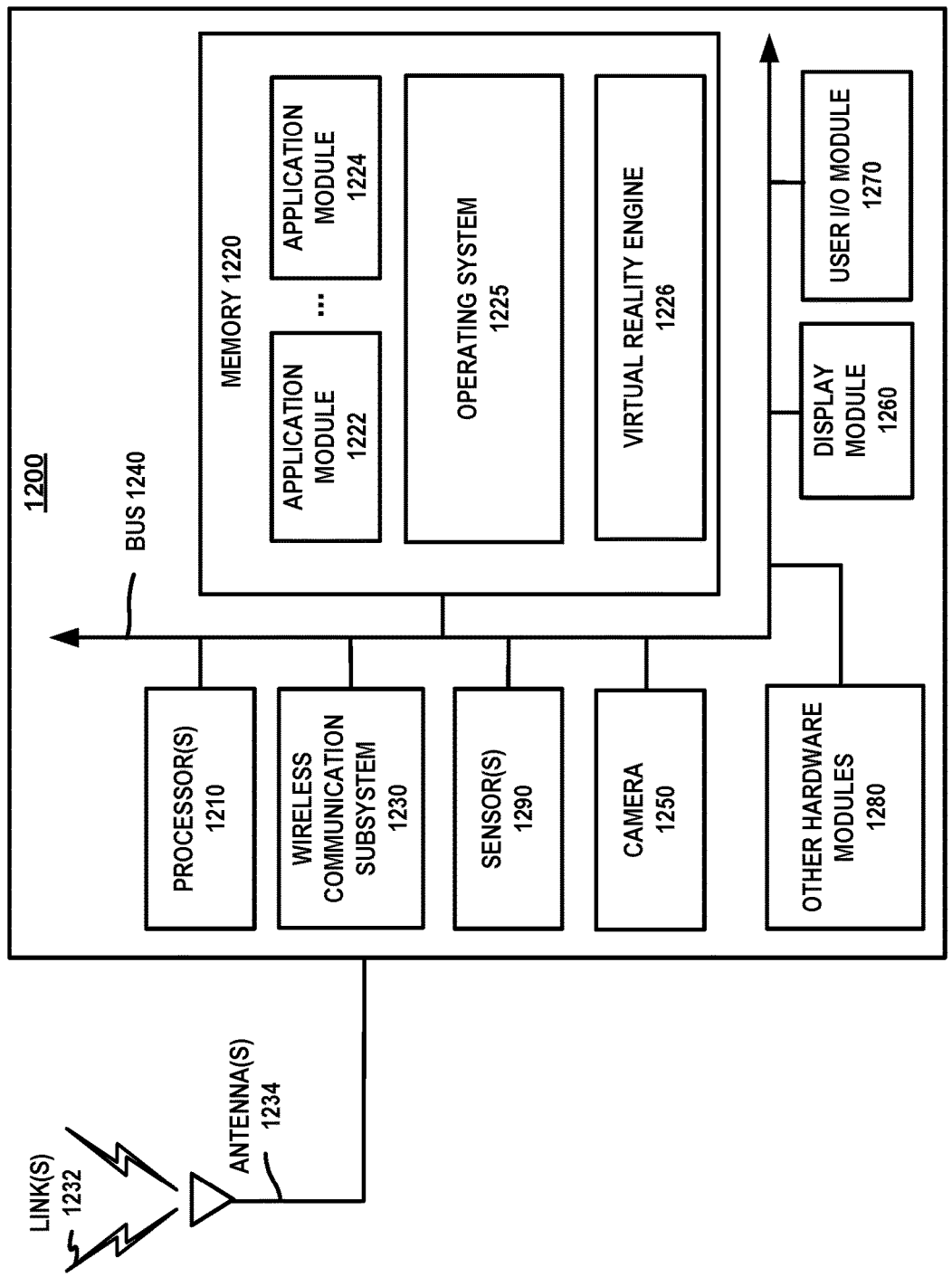
FIG. 12 is a block diagram of an example electronic system usable for implementing one or more embodiments.

FIG. 12 is a block diagram of an example electronic system 1200 usable for implementing one or more of the embodiments disclosed herein. For example, electronic system 1200 may correspond to a near-eye display (e.g., HMD) and/or a console in an artificial reality system environment such as that depicted in FIG. 1. Electronic system 1200 may include one or more processors 1210 and a memory 1220. Processor(s) 1210 may be configured to execute instructions for performing operations at a number of components, and can include, for example, a general-purpose processor or microprocessor suitable for implementation within a portable electronic device. In some embodiments, at least some of the processor(s) 1210 are embedded on an SoC integrated circuit. Processor(s) 1210 may be communicatively coupled with a plurality of components within electronic system 1200. To realize this communicative coupling, processor(s) 1210 may communicate with the other illustrated components across a bus 1240. Bus 1240 may be any subsystem adapted to transfer data within electronic system 1200. Bus 1240 may include a plurality of computer buses and additional circuitry to transfer data.

Memory 1220 may be coupled to processor(s) 1210. In some embodiments, memory 1220 may offer both short-term and long-term storage and may be divided into several units. Memory 1220 may be volatile, such as static random access memory (SRAM) and/or dynamic random access memory (DRAM) and/or non-volatile, such as read-only memory (ROM), flash memory, and the like. Furthermore, memory 1220 may include removable storage devices, such as secure digital (SD) cards. Memory 1220 may provide storage of computer-readable instructions, data structures, software modules, and other data for electronic system 1200. In some embodiments, memory 1220 may be distributed into different hardware modules. A set of instructions and/or code may be stored on memory 1220. The instructions can take the form of executable code, source code, and/or installable code.

In some embodiments, memory 1220 may store a plurality of application modules 1222 to 1224, which may include any number of applications. Examples of applications may include gaming applications, conferencing applications, video playback applications, or other suitable applications. The applications may include a depth sensing function or eye tracking function. Application modules 1222-1224 may include particular instructions to be executed by processor(s) 1210. In some embodiments, certain applications or parts of application modules 1222-1224 may be executable by other hardware modules 1280. In certain embodiments, memory 1220 may additionally include secure memory, which may include additional security controls to prevent copying or other unauthorized access to secure information.

In some embodiments, memory 1220 may include an operating system 1225 loaded therein. Operating system 1225 may be operable to initiate the execution of the instructions provided by application modules 1222-1224 and/or manage other hardware modules 1280 as well as interfaces with a wireless communication subsystem 1230 which may include one or more wireless transceivers. Operating system 1225 may be adapted to perform other operations across the components of electronic system 1200 including threading, resource management, data storage control and other similar functionality.

Wireless communication subsystem 1230 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1200 may include one or more antennas 1234 for wireless communication as part of wireless communication subsystem 1230 or as a separate component coupled to any portion of the system. Depending on desired functionality, wireless communication subsystem 1230 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other type of network. The techniques described herein may also be used for any combination of WWAN, WLAN, and/or WPAN. Wireless communications subsystem 1230 may permit data to be exchanged with a network, other computer systems, and/or any other devices described herein. Wireless communication subsystem 1230 may include a means for transmitting or receiving data, such as identifiers of HMD devices, position data, a geographic map, a heat map, photos, or videos, using antenna(s) 1234 and wireless link(s) 1232. Wireless communication subsystem 1230, processor(s) 1210, and memory 1220 may together comprise at least a part of one or more means for performing some functions disclosed herein.

Electronic system 1200 may include one or more sensors 1290. Sensor(s) 1290 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1290 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or any combination thereof. The position sensors may be located external to the IMU, internal to the IMU, or any combination thereof. At least some sensors may use a structured light pattern for sensing.

Electronic system 1200 may include a display module 1260. Display module 1260 can be a near-eye display and may graphically present information, such as images, videos, and instructions, from electronic system 1200 to a user. Such information may be derived from one or more application modules 1222-1224, virtual reality engine 1226, one or more other hardware modules 1280, a combination thereof, or any other suitable means for generating graphical content for presentation to the user. Display module 1260 may use LCD technology, LED technology, light emitting polymer display (LPD) technology, or some other display technology. In some embodiments, display module 1260 may include control components configured to perform foveated imaging in accordance with the techniques described herein.

Electronic system 1200 may include a user input/output module 1270. User input/output module 1270 may allow a user to send action requests to electronic system 1200. An action request may be a request to perform a particular action. For example, an action request may be to start or end an application or to perform a particular action within the application. User input/output module 1270 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1200. In some embodiments, user input/output module 1270 may provide haptic feedback to the user in accordance with instructions received from electronic system 1200. For example, the haptic feedback may be provided when an action request is received or has been performed.

Electronic system 1200 may include a camera 1250 that can be used to take photos or videos of a user, for example, for tracking the user's eye position. Camera 1250 may also be used to take photos or videos of the environment, for example, for VR, AR, or MR applications. Camera 1250 may include, for example, a complementary metal-oxide-semiconductor (CMOS) image sensor with a few millions or tens of millions of pixels. In some implementations, camera 1250 may include two or more cameras that may be used to capture three-dimensional images.

In some embodiments, electronic system 1200 may include a plurality of other hardware modules 1280. A hardware module 1280 may be a physical module within electronic system 1200. Some hardware modules 1280 may be temporarily configured to perform specific functions or temporarily activated. Hardware modules 1280 may include, for example, an audio output and/or input module (e.g., a microphone or speaker), a near field communication (NFC) module, a rechargeable battery, a battery management system, a wired/wireless battery charging system, and/or the like. In some embodiments, one or more functions of hardware modules 1280 may be implemented in software.

In some embodiments, memory 1220 may store a virtual reality engine 1226. Virtual reality engine 1226 may execute applications within electronic system 1200 and receive position information, acceleration information, velocity information, predicted future positions, or any combination thereof from various sensors 1290. In some embodiments, the information received by virtual reality engine 1226 may be used for producing a signal (e.g., display instructions) to display module 1260. For example, if the received information indicates that the user has looked to the left, virtual reality engine 1226 may generate content for the display module 1260 that mirrors the user's eye movement in a virtual environment. Additionally, virtual reality engine 1226 may perform an action within an application in response to an action request received from user input/output module 1270 and provide feedback to the user. The provided feedback may be visual, audible, or haptic feedback. In some implementations, processor(s) 1210 may include one or more GPUs that execute virtual reality engine 1226.

In various implementations, the above-described hardware and modules may be implemented on a single device or on multiple devices that can communicate with one another using wired or wireless connections. For example, in some implementations, some components or modules, such as GPUs, virtual reality engine 1226, and applications (e.g., an eye-tracking application), may be implemented on a console separate from the near-eye display. In some implementations, one console may be connected to or support more than one near-eye display.

In alternative configurations, different and/or additional components may be included in electronic system 1200. Similarly, functionality of one or more of the components can be distributed among the components in a manner different from the manner described above. For example, in some embodiments, electronic system 1200 may be modified to include other system environments, such as an augmented reality system environment and/or mixed reality system environment.

In the present disclosure, for the purposes of explanation, specific details are set forth in order to provide a thorough understanding of the disclosed examples. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a software module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A system comprising:
    a display comprising a plurality of light sources arranged in rows and columns;
    a display controller; and
    control logic communicatively coupled to the display, wherein the display controller is configured to:
        obtain coordinates of a focus point on the display, wherein the focus point is determined through tracking an eye movement of a user viewing the display;
        determine, based on the coordinates of the focus point, boundaries of a first image region and a second image region in an output image to be rendered on the display, wherein a resolution of the first image region is higher than a resolution of the second image region; and
        send image data together with control signals to the control logic, wherein the control signals cause the control logic to render the output image on the display using the image data; and
    wherein the control logic is configured to, as part of rendering the second image region, output a shared signal onto signal lines that are coupled to light sources in a group of adjacent rows or columns.

2. The system of claim 1, further comprising:
    an eye-tracking unit communicatively coupled to the display controller, wherein the eye-tracking unit is configured to capture at least one image of the user's eye, and wherein the eye-tracking unit or the display controller is configured to determine the focus point using the at least one image.

3. The system of claim 1, wherein the display controller is configured to vary a size, a location, or both a size and a location, of at least the first image region in response to a change in the focus point.

4. The system of claim 1, wherein the second image region at least partially surrounds the first image region.

5. The system of claim 1, wherein the display controller is configured to set a size of the first image region according to a first viewing angle and a size of the second image region according to a second viewing angle, and wherein the first viewing angle and the second viewing angle are programmable according to input from the user.

6. The system of claim 1, wherein the shared signal is a scan signal.

7. The system of claim 1, wherein the shared signal is a signal carrying foveated image data.

8. The system of claim 1, wherein the control signals indicate the boundaries of the first image region and the second image region.

9. The system of claim 1, wherein the output image includes at least one additional image region having a resolution lower than the resolution of the first image region but higher than the resolution of the second image region.

10. A method comprising:
obtaining, by a display controller, coordinates of a focus point on a display, wherein the focus point is determined through tracking an eye movement of a user viewing the display;
determining, by the display controller and based on the coordinates of the focus point, boundaries of a first image region and a second image region in an output image to be rendered on the display, wherein a resolution of the first image region is higher than a resolution of the second image region; and
sending, by the display controller, image data together with control signals to control logic communicatively coupled to the display, wherein:
the display comprises a plurality of light sources arranged in rows and columns;
the control signals cause the control logic to render the output image on the display using the image data; and
the control logic is configured to, as part of rendering the second image region, output a shared signal onto signal lines that are coupled to light sources in a group of adjacent rows or columns.

11. The method of claim 10, further comprising:
capturing, by an eye-tracking unit communicatively coupled to the display controller, at least one image of the user's eye; and
determining, by the eye-tracking unit or the display controller, the focus point using the at least one image.

12. The method of claim 10, further comprising:
varying, by the display controller, a size, a location, or both a size and a location, of at least the first image region in response to a change in the focus point.

13. The method of claim 10, wherein the second image region at least partially surrounds the first image region.

14. The method of claim 10, further comprising:
setting, by the display controller, a size of the first image region according to a first viewing angle and a size of the second image region according to a second viewing angle, wherein the first viewing angle and the second viewing angle are programmed according to input from the user.

15. The method of claim 10, wherein the shared signal is a scan signal.

16. The method of claim 10, wherein the shared signal is a signal carrying foveated image data.

17. The method of claim 10, wherein the control signals indicate boundaries of the first image region and the second image region.

18. The method of claim 10, wherein the output image includes at least one additional image region having a resolution lower than the resolution of the first image region but higher than the resolution of the second image region.

19. A non-transitory computer-readable medium storing instructions that, when executed by one or more processors of a display controller, cause the display controller to:
obtain coordinates of a focus point on a display, wherein the focus point is determined through tracking an eye movement of a user viewing the display;
determine, based on the coordinates of the focus point, boundaries of a first image region and a second image region in an output image to be rendered on the display, wherein a resolution of the first image region is higher than a resolution of the second image region; and
send image data together with control signals to control logic communicatively coupled to the display, wherein:
the display comprises a plurality of light sources arranged in rows and columns;
the control signals cause the control logic to render the output image on the display using the image data; and
the control logic is configured to, as part of rendering the second image region, output a shared signal onto signal lines that are coupled to light sources in a group of adjacent rows or columns.

20. The non-transitory computer-readable medium of claim 19, wherein the shared signal is a scan signal or a signal carrying foveated image data.

* * * * *